(12) United States Patent
Ko et al.

(10) Patent No.: US 12,712,960 B2
(45) Date of Patent: Aug. 18, 2026

(54) ELECTRONIC DEVICE COMPRISING SPEAKER STRUCTURE

(71) Applicant: SAMSUNG ELECTRONICS CO., LTD., Suwon-si (KR)

(72) Inventors: Jeeyoun Ko, Suwon-si (KR); Kiyoung Jung, Suwon-si (KR); Jungchul An, Suwon-si (KR); Minsik Lim, Suwon-si (KR); Youngjin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 152 days.

(21) Appl. No.: 18/244,084

(22) Filed: Sep. 8, 2023

(65) Prior Publication Data

US 2023/0421684 A1 Dec. 28, 2023

Related U.S. Application Data

(63) Continuation of application No. PCT/KR2022/002814, filed on Feb. 25, 2022.

(30) Foreign Application Priority Data

Mar. 10, 2021 (KR) ........................ 10-2021-0031619

(51) Int. Cl.

*H04M 1/03* (2006.01)
*H04M 1/02* (2006.01)
*H04R 1/02* (2006.01)

(52) U.S. Cl.

CPC ........... *H04M 1/03* (2013.01); *H04M 1/0216* (2013.01); *H04M 1/0264* (2013.01); *H04R 1/026* (2013.01); *H04R 2499/11* (2013.01)

(58) Field of Classification Search

CPC .... H04M 1/03; H04M 1/0216; H04M 1/0264; H04R 1/026

See application file for complete search history.

(56) References Cited

U.S. PATENT DOCUMENTS 9,537,527 B2 1/2017 Huh et al.
10,171,896 B2 1/2019 Seo et al.
(Continued)

FOREIGN PATENT DOCUMENTS

CN 108429839 A 8/2018
CN 109951582 B 2/2021
(Continued)

OTHER PUBLICATIONS

Manual Translation of KR20190075021A (Year: 2025).*
(Continued)

*Primary Examiner* — Allen L Parker
*Assistant Examiner* — Peter Krim
(74) *Attorney, Agent, or Firm* — Sughrue Mion, PLLC

(57) ABSTRACT

An electronic device is provided. The electronic device includes: a first housing; a display on a front surface of the first housing; a camera provided on the first housing; an upper speaker module provided on the first housing adjacent the camera; an upper sound hole that extends through an upper lateral surface of the first housing and is configured to emit sound generated by the upper speaker module to outside the electronic device; an upper conduit including a first conduit extending from the upper speaker module toward the upper sound hole in an extension direction, and a second conduit extending in a direction perpendicular to the extension direction of the first conduit; and an expansion portion extending from the upper conduit into the first housing to expand an internal volume of the upper conduit.

17 Claims, 13 Drawing Sheets

(56) References Cited

U.S. PATENT DOCUMENTS

| | | | | |
|---|---|---|---|---|
| 10,250,729 | B1 | 4/2019 | Jeon et al. | |
| 10,433,438 | B2 | 10/2019 | Moon et al. | |
| 11,228,832 | B2 | 1/2022 | Sim et al. | |
| 11,528,543 | B2 | 12/2022 | Yin et al. | |
| 2004/0198239 | A1 | 10/2004 | Patterson | |
| 2009/0264156 | A1* | 10/2009 | Burghardt | H04M 1/021 455/566 |
| 2015/0062025 | A1 | 3/2015 | Lee et al. | |
| 2018/0132020 | A1* | 5/2018 | Seo | H04M 1/03 |
| 2018/0206354 | A1 | 7/2018 | Yoon et al. | |
| 2018/0295222 | A1 | 10/2018 | Jung et al. | |
| 2019/0033920 | A1* | 1/2019 | Yun | G06F 1/1641 |
| 2019/0037293 | A1* | 1/2019 | Kim | H04M 1/026 |
| 2019/0163241 | A1 | 5/2019 | Moon et al. | |
| 2019/0166422 | A1 | 5/2019 | Cho et al. | |
| 2019/0199839 | A1* | 6/2019 | Jeon | H04M 1/18 |
| 2019/0320253 | A1* | 10/2019 | Park | H04M 1/026 |
| 2019/0339739 | A1* | 11/2019 | Park | H04M 1/0218 |
| 2020/0021674 | A1* | 1/2020 | Cheng | H04M 1/0268 |
| 2020/0213741 | A1 | 7/2020 | Shen et al. | |
| 2020/0252706 | A1* | 8/2020 | Yin | H04M 1/035 |
| 2020/0267861 | A1 | 8/2020 | Kim | |
| 2021/0006876 | A1 | 1/2021 | Moon et al. | |
| 2021/0037125 | A1 | 2/2021 | Jung et al. | |
| 2021/0144458 | A1* | 5/2021 | Zhang | H04R 1/02 |
| 2021/0392221 | A1 | 12/2021 | Lin et al. | |
| 2022/0046121 | A1* | 2/2022 | Mai | H04M 1/026 |
| 2023/0046958 | A1 | 2/2023 | Yun et al. | |
| 2023/0095163 | A1* | 3/2023 | Chen | H04R 1/08 455/566 |

FOREIGN PATENT DOCUMENTS

| | | | | |
|---|---|---|---|---|
| EP | 1 570 629 B1 | 6/2012 | | |
| EP | 3 566 426 B1 | 3/2021 | | |
| JP | 2017-135618 A | 8/2017 | | |
| JP | 2023-541342 A | 10/2023 | | |
| KR | 10-2013-0076450 A | 7/2013 | | |
| KR | 10-2015-0026537 A | 3/2015 | | |
| KR | 10-1574794 B1 | 12/2015 | | |
| KR | 10-1612791 B1 | 4/2016 | | |
| KR | 10-2018-0001015 A | 1/2018 | | |
| KR | 10-2018-0051983 A | 5/2018 | | |
| KR | 10-2019-0034063 A | 4/2019 | | |
| KR | 10-2019-0075021 A | 6/2019 | | |
| KR | 20190075021 A | 6/2019 | * | H04R 1/2826 |
| KR | 10-2021493 B1 | 9/2019 | | |
| KR | 10-2020-0101791 A | 8/2020 | | |
| KR | 10-2020-0119105 A | 10/2020 | | |
| KR | 10-2021-0003538 A | 1/2021 | | |
| KR | 10-2021-0015268 A | 2/2021 | | |
| KR | 10-2349710 B1 | 1/2022 | | |
| WO | 202001 4838 A | 1/2020 | | |
| WO | 2020/216003 A1 | 10/2020 | | |

OTHER PUBLICATIONS

Written Opinion & International Search Report (PCT/ISA/237 & 210) dated May 31, 2022 issued from the International Searching Authority in International Application No. PCT/KR2022/002814.

Office Action issued on Feb. 13, 2024 by the Korean Intellectual Property Office in Korean Patent Application No. 10-2021-0031619.

Notice of Allowance issued Feb. 15, 2024 by the Russian Patent Office in corresponding Russian Patent Application No. 2023123334/28(051353).

Communication dated Nov. 14, 2023, issued by the Russian Federal Service for Intellectual Property in Russian Application No. 2023123334/28(051353).

Communication issued Sep. 4, 2024, by the Intellectual Property Office of Australia in the Australian Patent Application No. 2022235364.

Communication issued Oct. 15, 2024, by the Japanese in the Japanese Patent Application No. 2023-555414.

Communication issued Oct. 15, 2024, by the Saudi Authority for Intellectual Property in the Saudi Arabian Patent Application No. 5223450605.

Communication issued May 22, 2024 by the Intellectual Property Office of Australia in the Australian Patent Application No. 2022235364.

Communication issued Jun. 28, 2024 by the European Patent Office in the European Patent Application No. 22767378.7.

Communication issued Jul. 11, 2025 by the European Patent Office in European Patent Application No. 22767378.7.

Communication issued Aug. 13, 2025 by the Vietnam Patent Office in Vietnamese Patent Application No. 1-2023-06026.

Office Action dated Mar. 22, 2025, issued by Indian Patent Office in Indian Patent Application No. 202347060770.

Notice of Allowance dated Apr. 30, 2025, issued by Japanese Patent Office in Japanese Patent Application No. 2023-555414.

Communication dated Oct. 1, 2025 issued by the Indonesian Patent Office in Indonesian Patent Application No. P00202308531.

Communication dated Apr. 22, 2026 issued by the Malaysian Ministry of Intellectual Property in counterpart Malaysian Patent Application No. PI 2023005292.

Communication issued May 20, 2026 by the China National Intellectual Property Administration in counterpart Chinese Patent Application No. 202280018098.6.

* cited by examiner

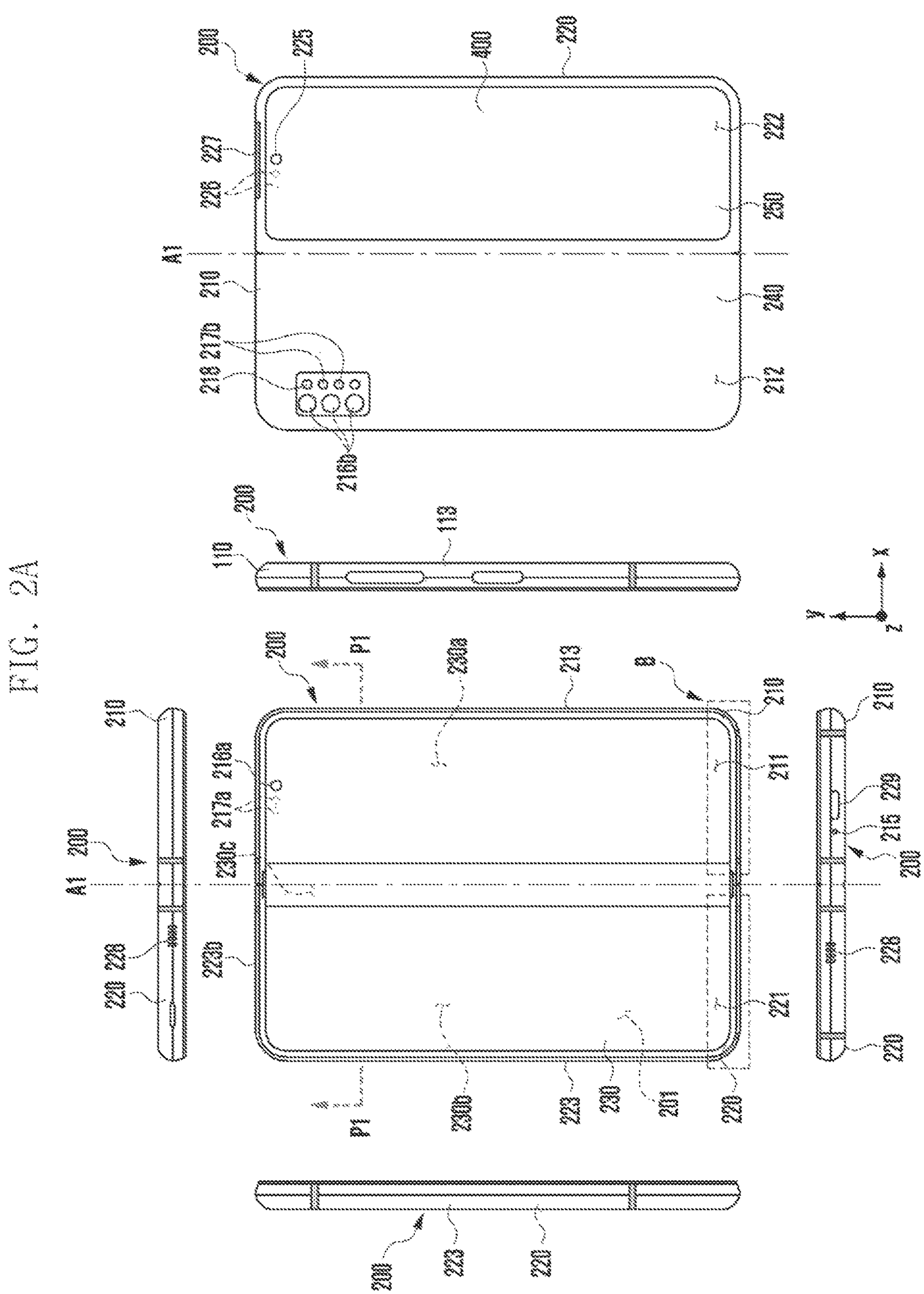

200
265
210 218 217b
240
212
216b
219
219
210
220
220
400
222
227
226
225
265
250
210
220
228
200
265
220
210
228
215
229
200
265
200
265

ELECTRONIC DEVICE COMPRISING SPEAKER STRUCTURE

CROSS-REFERENCE TO RELATED APPLICATION(S)

This application is a bypass continuation application of International Application No. PCT/KR2022/002814, filed on Feb. 25, 2022, which is based on and claims priority to Korean Patent Application No. 10-2021-0031619, filed on Mar. 10, 2021, in the Korean Intellectual Property Office, the disclosures of which are incorporated by reference herein in their entireties.

BACKGROUND

1. Field

The disclosure relates to an electronic device including a speaker structure.

2. Description of Related Art

Electronic devices are constantly diversifying. In addition to bar-type electronic devices, various types of electronic devices, such as foldable electronic devices and rollable electronic devices, are being released.

The electronic device may be provided with more than one speaker, and dual speakers may be installed on both upper and lower ends of a portable electronic device.

The electronic device may include a front camera in addition to a rear camera.

For aesthetics of an electronic device, sound holes for radiating sound output from a speaker of the electronic device may be symmetrically formed through a housing of the electronic device.

For example, an upper sound hole and a lower sound hole may be disposed at the upper central portion and at the lower central portion of the electronic device, respectively, to be symmetrical to each other, and a speaker module connected to the upper sound hole and a speaker module connected to the lower sound hole may also be disposed at the upper central portion and at the lower central portion of the housing, respectively. For aesthetics, a camera module may be disposed at the center of the upper end of the electronic device so that a camera hole is located at the upper central portion of the display.

In this case, overlap between the camera module and the upper speaker module may occur.

When the volume of a conduit configured to guide sound of a speaker module is reduced, sound quality may be deteriorated.

SUMMARY

Provided is an electronic device including a speaker module that addresses the above problems.

In accordance with an aspect of the disclosure, an electronic device includes: a first housing; a display on a front surface of the first housing; a camera provided on the first housing; an upper speaker module provided on the first housing adjacent the camera; an upper sound hole that extends through an upper lateral surface of the first housing and is configured to emit sound generated by the upper speaker module to outside the electronic device; an upper conduit including a first conduit extending from the upper speaker module toward the upper sound hole in an extension direction, and a second conduit extending in a direction perpendicular to the extension direction of the first conduit; and an expansion portion extending from the upper conduit into the first housing to expand an internal volume of the upper conduit.

A straight line may extend in the extension direction between the first conduit and the second conduit, and through the upper sound hole, the upper speaker module may be provided on a first side of the straight line, and the camera may be provided on a second side of the straight line.

The first conduit may be provided on the first side of the straight line, and the second conduit may be provided on the second side of the straight line.

The second conduit may be narrower than the first conduit along the extension direction.

The upper sound hole may include at least one hole, and the at least one hole of the upper sound hole may extend in the extension direction.

The upper speaker module may be configured to radiate sound through the upper sound hole in the extension direction, and the first conduit may include a structure inclined with respect to the extension direction.

The electronic device may further include a second housing that is foldably connected to the first housing.

The display may include a first region provided in the first housing, a second region provided in the second housing, and a third region connecting the first region and the second region, and the third region of the display may be at least partially foldable.

The expansion portion may be connected to an opening extending through a rear surface of the first housing, and the electronic device further may include a soundproofing material provided in the opening.

The soundproofing material may include a buffer.

The upper speaker module may be provided on an upper portion of the first housing. The electronic device may further include: a lower speaker module provided at a lower portion of the first housing; a lower sound hole extending through a lower lateral surface of the first housing; and a lower conduit extending from the lower speaker module to the lower sound hole.

The lower sound hole may include at least one hole, and the at least one hole of the lower sound hole may extend in the extension direction.

In accordance with another aspect of the disclosure, an electronic device includes: a display extending in a first longitudinal direction and a second longitudinal direction which crosses the first longitudinal direction; a rear cover; a side structure that extends from the display to the rear cover; a first speaker that is provided in a space between the rear cover and the display, and is configured to emit sound through first holes and second holes that are formed through the side structure, wherein the first holes overlap the first speaker along the first longitudinal direction and the second holes are offset from the first speaker along the second longitudinal direction; a first conduit including a first portion extending in the first longitudinal direction from the first speaker to the first holes and a second portion that is offset from the first speaker along the first longitudinal direction and is communicably connected to the first portion; and an expansion portion extending from the first conduit to expand an internal volume of the first conduit.

The display may be configured to emit light in a display direction, and the first longitudinal direction and the second longitudinal direction may be perpendicular to the display direction.

The first holes and the second holes may be sequentially provided through the side structure and arranged in the second longitudinal direction.

Each of the first holes and the second holes may extend through the side structure in the first longitudinal direction.

The electronic device may further include a camera provided in the space. The camera may overlap the first speaker along the second longitudinal direction.

In accordance with another aspect of the disclosure, an electronic device includes: a display; a first rear cover; a second rear cover; a hinge structure connected to the first rear cover and the second rear cover and configured to be folded about a folding axis, wherein the folding axis extends in an extension direction; a first side structure that extends from the display to the first rear cover; a second side structure that extends from the display to the second rear cover; a first speaker that is provided in a first space between the first rear cover and the display, and is configured to emit sound through first holes that are formed through the first side structure and second holes that are formed through the second side structure, wherein the first holes overlap the first speaker along the extension direction and the second holes are offset from the first speaker along a direction perpendicular to the extension direction; a first conduit including a first portion and a second portion, wherein the first portion is provided in the first space and extends in the extension direction from the first speaker to the first holes, the second portion is provided in a second space between the second rear cover and the display, is offset from the first speaker along the direction perpendicular to the extension direction, and is communicably connected to the first portion; and an expansion portion extending from the first conduit to expand an internal volume of the first conduit.

The electronic device may further include a camera provided in the second space. The camera may overlap the first speaker along the direction perpendicular to the extension direction while the electronic device is in an unfolded configuration.

The camera may overlaps the first speaker and the first portion of the first conduit along the direction perpendicular to the extension direction while the electronic device is in an unfolded configuration.

One or more embodiments, provide a structure in which a speaker module and a camera module are located on the central portion of an electronic device, in consideration of the aesthetics of the electronic device.

In addition, one or more embodiments address the sound quality problem due to the adjacent arrangement of the speaker module and the camera module.

BRIEF DESCRIPTION OF DRAWINGS

The above and other aspects, features and advantages of certain embodiments of the present disclosure will be more apparent from the following description taken in conjunction with the accompanying drawings, in which:

FIG. 2A illustrates an unfolded state of an electronic device according to various embodiments;

DETAILED DESCRIPTION

Figure 1:
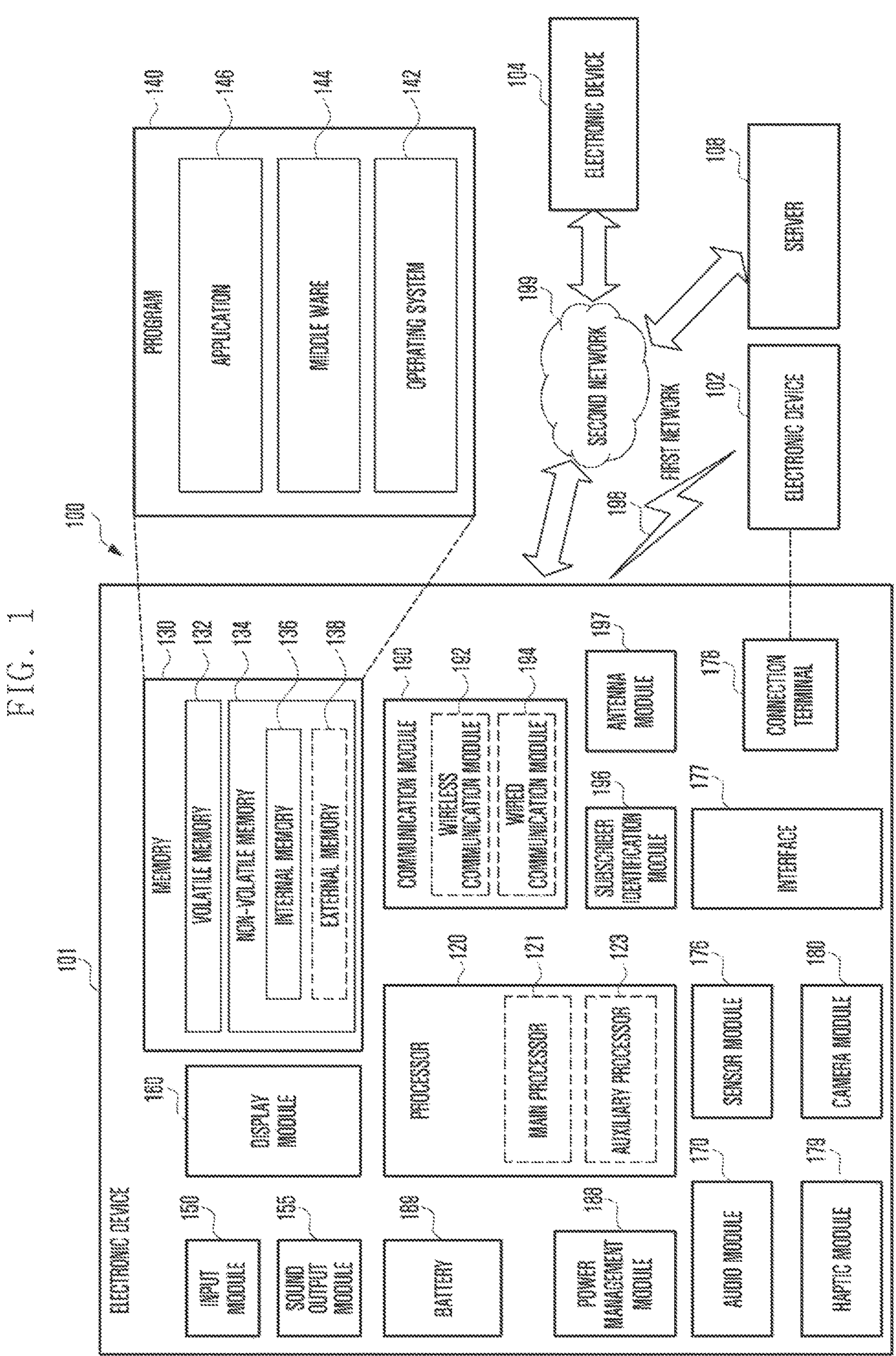
FIG. 1 is a block diagram of an electronic device in a network environment according to various embodiments.

Embodiments will be described in detail with reference to the accompanying drawings. The same reference numerals are used for the same components in the drawings, and redundant descriptions thereof are omitted. Each embodiment provided in the following description is not excluded from being associated with one or more features of another example or another embodiment also provided herein or not provided herein but consistent with the present disclosure.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, the terms "1st" or "first" and "2nd" or "second" may use corresponding components regardless of importance or order and are used to distinguish a component from another component without limiting the components. Expressions such as "at least one of" when preceding a list of elements, modify the entire list of elements and do not modify the individual elements of the list. For example, the expression, "at least one of a, b, or c," should be understood as including only a, only b, only c, both a and b, both a and c, both b and c, or all of a, b, and c. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2B:
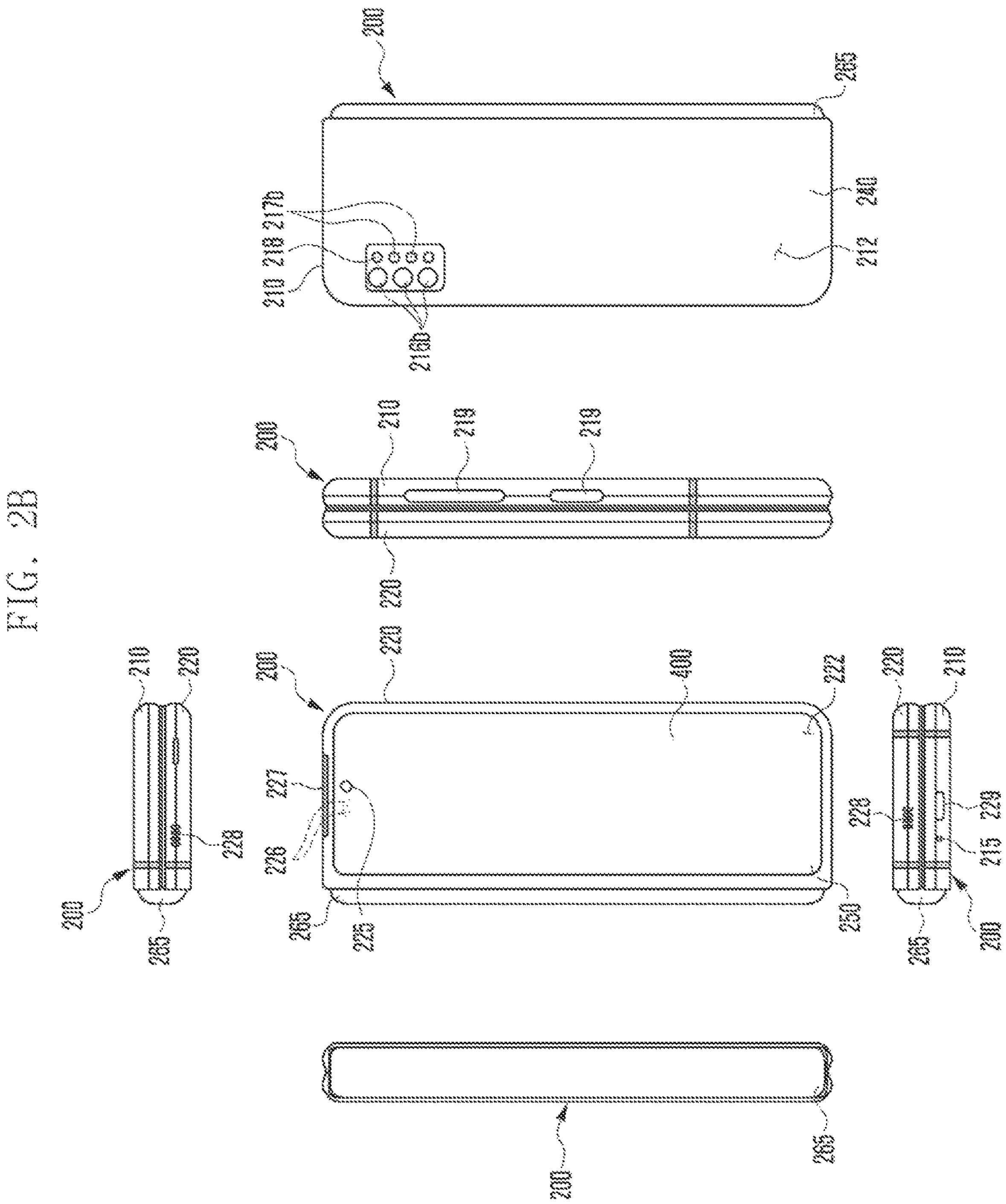
FIG. 2B illustrates a folded state of the electronic device of FIG. 2A according to various embodiments.

FIG. 2A is a diagram illustrating an unfolded state of an electronic device 200 according to various embodiments. FIG. 2B is a diagram illustrating a folded state of the electronic device 200 of FIG. 2A according to various embodiments.

Referring to FIGS. 2A and 2B, the electronic device 200 may include a pair of housings 210 and 220 (e.g., foldable housing) rotatably coupled based on a folding axis A1 through a hinge device (e.g., a hinge device 264 of FIG. 3) to be foldable with respect to each other, a first display 230 (e.g., flexible display, foldable display, or main display) exposed through the pair of housings 210 and 220, and/or a second display 400 (e.g., sub-display) exposed through the second housing 220. According to some embodiments, at least a portion (e.g., hinge devices 320 and 320-1 of FIG. 3) of the hinge device (e.g., the hinge device 264 of FIG. 3) may be disposed to not be visible from the outside through the first housing 210 and the second housing 220. For example, a hinge cover 265 may cover a foldable portion in an unfolded state. In this document, a surface in which the first display 230 is disposed may be referred to as a front surface of the electronic device 200, and an opposite surface of the front surface may be referred to as a rear surface of the electronic device 200. Further, a surface enclosing a space between the front surface and the rear surface may be referred to as a side surface of the electronic device 200.

Figure 3:
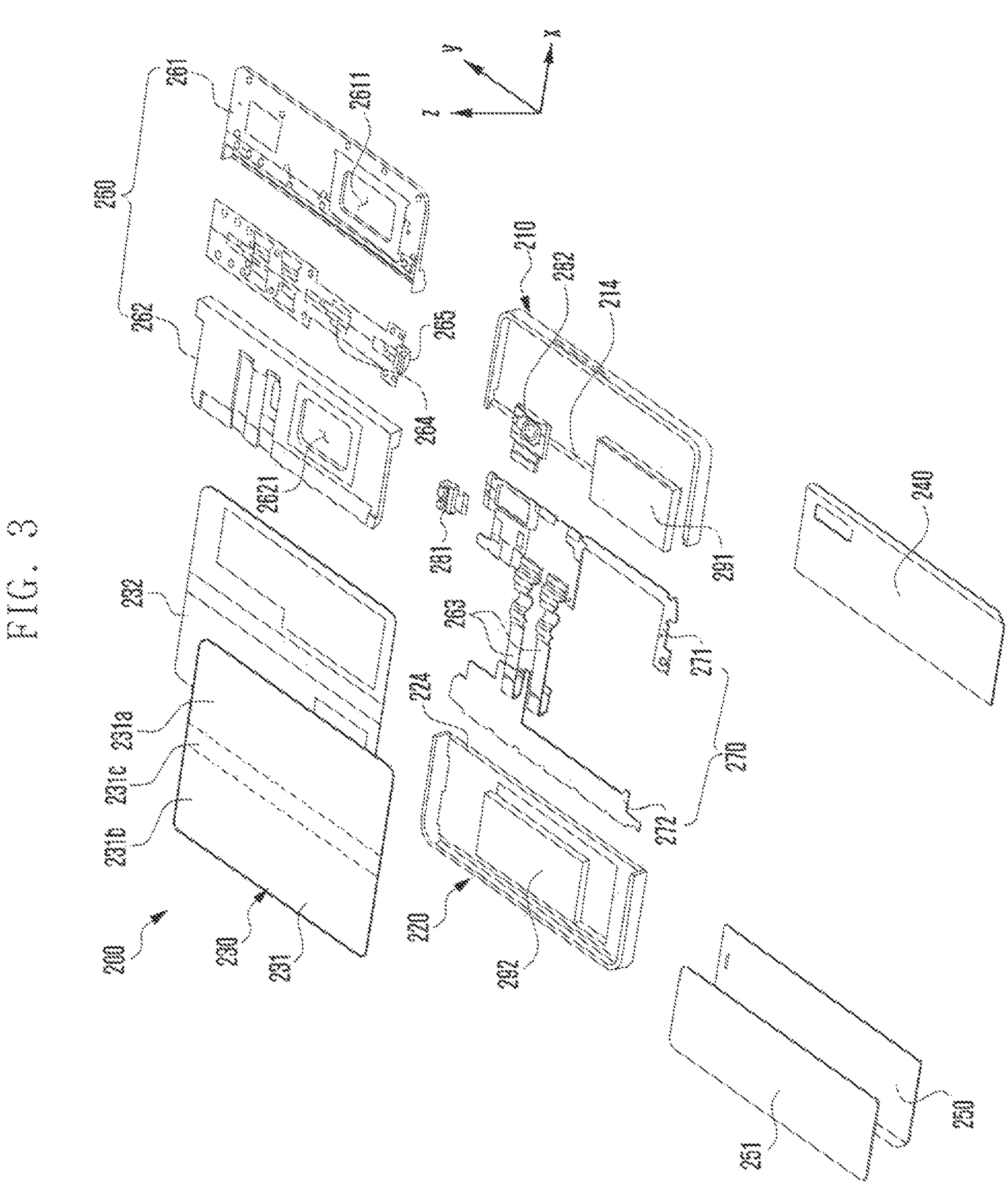
FIG. 3 is an exploded perspective view of an electronic device according to various embodiments.

According to various embodiments, the pair of housings 210 and 220 may include a first housing 210 and second housing 220 disposed to be foldable with respect to each other through the hinge device (e.g., the hinge device 264 of FIG. 3). The pair of housings 210 and 220 are not limited to the shape and coupling illustrated in FIGS. 2A and 2B, and may be implemented by a combination of other shapes or parts, which may be coupled in various manners. According to some embodiments, the first housing 210 and the second housing 220 may be disposed at both sides based on the folding axis A1, and have an overall symmetrical shape with respect to the folding axis A1. According to some embodiments, the first housing 210 and the second housing 220 may be folded asymmetrically based on the folding axis A1. According to some embodiments, the first housing 210 and the second housing 220 may have different angles or distances from each other according to whether the electronic device 200 is in an unfolded state, a folded state, or an intermediate state.

According to various embodiments, when the electronic device 200 is in an unfolded state, the first housing 210 may include a first surface 211 connected to the hinge device (e.g., the hinge device 264 of FIG. 3) and disposed to face the front of the electronic device 200, a second surface 212 facing in a direction opposite to that of the first surface 211, and/or a first side member 213 enclosing at least a portion of a first space between the first surface 211 and the second surface 212. According to some embodiments, when the electronic device 200 is in an unfolded state, the second housing 220 may include a third surface 221 connected to the hinge device (e.g., the hinge device 264 of FIG. 3), and disposed to face the front of the electronic device 200, a fourth surface 222 facing in a direction opposite that of the third surface 221, and/or a second side member 223 enclosing at least a portion of a second space between the third surface 221 and the fourth surface 222. According to some embodiments, the first surface 211 may face in substantially the same direction as that of the third surface 221 when the electronic device is in an unfolded state and at least partially face the third surface 221 when the electronic device is in a folded state. According to some embodiments, the electronic device 200 may include a recess 201 formed to receive the first display 230 through structural coupling of the first housing 210 and the second housing 220. According to some embodiments, the recess 201 may have substantially the same size as that of the first display 230.

According to various embodiments, the hinge cover 265 (e.g., hinge cover) may be disposed between the first housing 210 and the second housing 220 and be disposed to cover a hinge device (e.g.: the hinge devices 320 and 320-1 of FIG. 3). According to some embodiments, the hinge cover 265 may be covered by a part of the first housing 210 and the second housing 220 or may be exposed to the outside according to whether the electronic device 200 is in an unfolded state, a folded state, or an intermediate state. For example, when the electronic device 200 is in an unfolded state, at least a portion of the hinge cover 265 may be covered by the first housing 210 and the second housing 220 to not be substantially exposed. According to some embodiments, when the electronic device 200 is in a folded state, at least a portion of the hinge cover 265 may be exposed to the outside between the first housing 210 and the second housing 220. According to some embodiments, when the first housing 210 and the second housing 220 are in an intermediate state folded with a certain angle, the hinge cover 265 may be at least partially exposed to the outside of the electronic device 200 between the first housing 210 and the second housing 220. For example, an area in which the hinge cover 265 is exposed to the outside may be smaller when the electronic device 200 is in an intermediate state than in a fully folded state. According to some embodiments, the hinge cover 265 may include a curved surface.

According to various embodiments, when the electronic device 200 is in an unfolded state (e.g., the state of FIG. 2A), the first housing 210 and the second housing 220 form an angle of approximately 180 degrees, and a first area 230*a*, a folding area 230*c*, and a second area 230*b* of the first display 230 may form the same flat surface and be disposed to face in substantially the same direction. In another embodiment, when the electronic device 200 is in an unfolded state, the first housing 210 may form an angle of approximately 360 degrees with respect to the second housing 220 so that the second surface 212 and the fourth surface 222 may be reversely folded to face each other (out-folding method).

According to various embodiments, when the electronic device 200 is in the folded state (e.g., the state of FIG. 2B), the first surface 211 of the first housing 210 and the third surface 221 of the second housing 220 may be disposed to face each other. In this case, the first area 230*a* and the second area 230*b* of the first display 230 may form a narrow angle (e.g., a range of 0 degree to approximately 10 degree) each other through the folding area 230*c* and be disposed to face each other. According to some embodiments, at least a portion of the folding area 230*c* may be transformed into a curved shape having a predetermined curvature. According to some embodiments, when the electronic device 200 is in an intermediate state, the first housing 210 and the second housing 220 may be disposed at a certain angle to each other. In this case, the first area 230*a* and the second area 230*b* of the first display 230 may form an angle larger than the folded state and smaller than the unfolded state, and a curvature of the folding area 230*c* may be smaller than that of the folded state and be larger than that of the unfolded state. In some embodiments, the first housing 210 and the second housing 220 may form an angle that may correspond to a specified folding angle between the folded state and the unfolded state through the hinge device (e.g., the hinge device 264 of FIG. 3) in which the hinge device stops at the specified folding angle (e.g., free stop function). In some embodiments, the first housing 210 and the second housing 220 may be operated while being pressurized in an unfolding direction or a folding direction based on a specified inflection angle through the hinge device (e.g., the hinge device 264 of FIG. 3).

According to various embodiments, the electronic device 200 may include at least one of at least one display 230 and 400, an input device 215, sound output devices 227 and 228, sensor modules 217*a*, 217*b*, and 226, camera modules 216*a*, 216*b*, and 225, a key input device 219, an indicator, or a connector port 229 disposed in the first housing 210 and/or the second housing 220. In some embodiments, the electronic device 200 may omit at least one of the components or may additionally include at least one other component.

According to various embodiments, the at least one display 230 and 400 may include a first display 230 (e.g., flexible display) disposed to receive support from the third surface 221 of the second housing 220 through the hinge device (e.g., the hinge device 264 of FIG. 3) from the first surface 211 of the first housing 210, and a second display 400 disposed to be visible at least partially from the outside through the fourth surface 222 in an inner space of the second housing 220. As another example, the second display 400 may be disposed to be visible from the outside through the second surface 212 in an inner space of the first housing 210. According to some embodiments, the first display 230 may be mainly used in an unfolded state of the electronic device 200, and the second display 400 may be mainly used in a folded state of the electronic device 200. According to some embodiments, when the electronic device 200 is in an intermediate state, the electronic device 200 may control the first display 230 and/or the second display 400 to be usable based on a folding angle of the first housing 210 and the second housing 220.

According to various embodiments, the first display 230 may be disposed in a receiving space formed by a pair of housings 210 and 220. For example, the first display 230 may be disposed in the recess 201 formed by the pair of housings 210 and 220, and when the electronic device 200 is in an unfolded state, the first display 230 may be disposed to occupy substantially most of the front surface of the electronic device 200. According to some embodiments, the first display 230 may include a flexible display whose at least a partial area may be transformed into a flat surface or a curved surface. According to some embodiments, the first display 230 may include a first area 230*a* facing the first housing 210, a second area 230*b* facing the second housing 220, and a folding area 230*c* connecting the first area 230*a* and the second area 230*b*, and facing the hinge device (e.g., the hinge device 264 of FIG. 3). According to some embodiments, the first display 230 may be physically divided by a pair of housings 210 and 220 and the hinge device (e.g., the hinge device 264 of FIG. 3), but embodiments are not limited thereto and the first display 230 may be displayed as a substantially seamless single full screen through the pair of housings 210 and 220 and the hinge device (e.g., the hinge device 264 of FIG. 3). According to some embodiments, the first area 230*a* and the second area 230*b* may have an overall symmetrical shape or a partially asymmetrical shape based on the folding area 230*c*.

According to various embodiments, the electronic device 200 may include a first rear cover 240 disposed at the second surface 212 of the first housing 210 and a second rear cover 250 disposed at the fourth surface 222 of the second housing 220. In some embodiments, at least a portion of the first rear cover 240 may be integrally formed with the first side member 213. In some embodiments, at least a portion of the second rear cover 250 may be integrally formed with the second side member 223. According to some embodiments, at least one cover of the first rear cover 240 and the second rear cover 250 may be formed with a substantially transparent plate (e.g., a polymer plate or a glass plate including various coating layers) or an opaque plate. According to some embodiments, the first rear cover 240 may be formed by an opaque plate such as, for example, coated or tinted glass, ceramic, polymer, metal (e.g., aluminum, stainless steel (STS), or magnesium), or a combination of at least two of the above materials. According to some embodiments, the second rear cover 250 may be formed through a substantially transparent plate such as glass or polymer, for example. Accordingly, the second display 400 may be disposed to be visible from the outside through the second rear cover 250 in an inner space of the second housing 220.

According to various embodiments, the input device 215 may include a microphone. In some embodiments, the input device 215 may include a plurality of microphones disposed to detect a direction of a sound. According to some embodiments, the sound output devices 227 and 228 may include speakers. According to some embodiments, the sound output devices 227 and 228 may include a call receiver 227 disposed through the fourth surface 222 of the second housing 220 and an external speaker 228 disposed through at least a portion of the second side member 223 of the second housing 220. In some embodiments, the input device 215, the sound output devices 227 and 228, and the connector port 229 may be disposed in spaces of the first housing 210 and/or the second housing 220 and be exposed to an external environment through at least one hole formed in the first housing 210 and/or the second housing 220. In some embodiments, holes formed in the first housing 210 and/or the second housing 220 may be commonly used for the input device 215 and the sound output devices 227 and 228. In some embodiments, the sound output devices 227 and 228 may include a speaker (e.g., piezo speaker) operating while excluding a hole formed in the first housing 210 and/or the second housing 220.

According to various embodiments, the camera modules 216*a*, 216*b*, and 225 may include a first camera module 216*a* disposed at the first surface 211 of the first housing 210, a second camera module 216*b* disposed at the second surface 212 of the first housing 210, and/or a third camera module 225 disposed at the fourth surface 222 of the second housing 220. According to some embodiments, the electronic device 200 may include a flash 218 disposed near the second camera module 216*b*. According to some embodiments, the flash 218 may include, for example, a light emitting diode or a xenon lamp. According to some embodiments, each of the camera modules 216*a*, 216*b*, and 225 may include one or a plurality of lenses, an image sensor, and/or an image signal processor. In some embodiments, at least one camera module of the camera modules 216*a*, 216*b*, and 225 may include two or more lenses (e.g., wide-angle and telephoto lenses) and image sensors which may be disposed together at the first housing 210 and/or the second housing 220.

According to various embodiments, the sensor modules 217*a*, 217*b*, and 226 may generate an electrical signal or a data value corresponding to an internal operating state of the electronic device 200 or an external environmental state. According to some embodiments, the sensor modules 217*a*, 217*b*, and 226 may include a first sensor module 217*a* disposed at the first surface 211 of the first housing 210, a second sensor module 217*b* disposed at the second surface 212 of the first housing 210, and/or a third sensor module 226 disposed at the fourth surface 222 of the second housing 220. In some embodiments, the sensor modules 217*a*, 217*b*, and 226 may include at least one of a gesture sensor, a grip sensor, a color sensor, an infrared (IR) sensor, an illuminance sensor, an ultrasonic sensor, an iris recognition sensor, or a distance detection sensor (e.g., time of flight (TOF) sensor or light detection and ranging (LiDAR)).

According to various embodiments, the electronic device 200 may further include a sensor module, for example, at least one of an atmospheric pressure sensor, a magnetic sensor, a biometric sensor, a temperature sensor, a humidity sensor, or a fingerprint recognition sensor. In some embodiments, the fingerprint recognition sensor may be disposed through at least one of the first side member 213 of the first housing 210 and/or the second side member 223 of the second housing 220.

According to various embodiments, the key input device 219 may be disposed to be exposed to the outside through the first side member 213 of the first housing 210. In some embodiments, the key input device 219 may be disposed to be exposed to the outside through the second side member 223 of the second housing 220. In some embodiments, the electronic device 200 may not include some or all of the key input devices 219, and the non-included key input devices 219 may be implemented into other forms such as soft keys on at least one display 230 and 400. As another embodiment, the key input device 219 may be implemented using a pressure sensor included in at least one display 230 and 400.

According to various embodiments, the connector port 229 may include a connector (e.g., USB connector or interface connector port module (IF module)) for transmitting and receiving power and/or data to and from an external electronic device. In some embodiments, the connector port 229 may further include a separate connector port (e.g., ear jack hole) for transmitting and receiving an audio signal to and from an external electronic device.

According to various embodiments, at least one camera module 216*a* and 225 of the camera modules 216*a*, 216*b*, and 225, at least one sensor module 217*a* and 226 of the sensor modules 217*a*, 217*b*, and 226, and/or the indicator may be disposed to be exposed through at least one display 230 and 400. For example, the at least one camera module 216*a* and 225, the at least one sensor module 217*a* and 226, and/or the indicator may be disposed under a display area of the displays 230 and 400 in an interior space of the at least one housing 210 and 220, and be disposed to contact an external environment through an opening or transparent area perforated to a cover member (e.g., a window layer of the first display 230 and/or the second rear cover 250). According to some embodiments, an area in which the displays 230 and 400 face the at least one camera module 216*a* and 225 is a part of an area which displays contents, and may be formed as a transmission area having predetermined transmittance. According to some embodiments, the transmission area may be formed to have transmittance in a range from approximately 5% to approximately 20%. Such a transmission area may include an area overlapped with an effective area (e.g., view angle area) of the at least one camera module 216*a* and 225 through which light for generating an image by an image sensor passes. For example, the transmission area of the displays 230 and 400 may include an area having a lower pixel density than that of a peripheral area thereof. For example, the transmission area may replace the opening. For example, the at least one camera module 216*a* and 225 may include an under display camera (UDC). In another embodiment, some camera modules or sensor modules 217*a* and 226 may be disposed to perform functions thereof without being visually exposed through the display. For example, an area facing the camera modules 216*a* and 225 and/or the sensor modules 217*a* and 226 disposed under the displays 230 and 400 (e.g., display panel) may have an under display camera (UDC) structure; thus, the displays 230 and 400 may have a perforated opening.

According to various embodiments, the electronic device 200 may include at least one antenna configured with at least a portion of the first side member 213 of the first housing 210. For example, the first side member may be a conductive side member. According to an embodiment, the at least one antenna may be disposed in an upper area and/or a lower area of the first housing 210.

According to embodiments, at least one antenna may be additionally implemented by using the second conductive side surface member 223 of the second housing 220 including the second display 400. According to an embodiment, at least one antenna may be additionally disposed in the upper area and/or the lower area of the second conductive side surface member 223. In this case, a conductive sheet of the second display 400 and a peripheral conductive structure (e.g., a substrate or a conductive electrical structure) used as a common ground may be electrically connected (grounded) to each other in at least one predetermined position in the vicinity of a feeding point of an antenna, which may be helpful to prevent deterioration in radiation performance of the antenna using the second side surface member 223.

FIG. 3 is an exploded perspective view illustrating an electronic device 200 according to various embodiments.

Referring to FIG. 3, the electronic device 200 may include a first display 230, a second display 400, a hinge device 264, a support member assembly 260, at least one printed circuit board 270, a first housing 210, a second housing 220, a first rear cover 240, and/or a second rear cover 250.

According to various embodiments, the first display 230 may include a display panel 231 (e.g., flexible display panel)

and one or more plates 232 or layers in which the display panel 231 is seated. According to some embodiments, the display panel 231 may include a first panel area 231*a* corresponding to the first area (e.g., the first area 230*a* of FIG. 2A) of the display 230, a second panel area 231*b* extended from the first panel area and corresponding to the second area (e.g., the second area 230*b* of FIG. 2A) of the display 230, and a third area 231*c* connecting the first panel area 231*a* and the second panel area 231*b* and corresponding to a folding area (e.g., the folding area 230*c* of FIG. 2A) of the display 230. According to some embodiments, the one or more plates 232 may include a conductive plate (e.g., Cu sheet or SUS sheet) disposed between the display panel 231 and the support member assembly 260. According to some embodiments, the one or more plates 232 may be formed to have substantially the same area as that of the first display 230, and an area facing a folding area (e.g., the folding area 230*c* of FIG. 2A) of the first display 230 may be formed to be bendable. According to some embodiments, the one or more plates 232 may include at least one auxiliary material layer (e.g., graphite member) disposed at a rear surface of the display panel 231. According to some embodiments, the one or more plates 232 may be formed in a shape corresponding to the display panel 231.

According to various embodiments, the second display 400 may be disposed in a space between the second housing 220 and the second rear cover 250. According to some embodiments, the second display 400 may be disposed to be visible from the outside through substantially the entire area of the second rear cover 250 in a space between the second housing 220 and the second rear cover 250.

According to various embodiments, the support member assembly 260 may include a first support member 261 (e.g., first support plate) and a second support member 262 (e.g., second support plate). According to some embodiments, the first support member 261 may be foldably coupled to the second support member 262 through the hinge device 264. According to some embodiments, the electronic device 200 may include at least one wiring member 263 (e.g., flexible printed circuit board (FPCB)) disposed from at least a portion of the first support member 261 across the hinge device 264 to a portion of the second support member 262. According to some embodiments, the support member assembly 260 may be disposed between one or more plates 232 and at least one printed circuit board 270. According to some embodiments, the first support member 261 may be disposed between the first area (e.g., the first area 230*a* of FIG. 2A) of the first display 230 and a first printed circuit board 271. According to some embodiments, the second support member 262 may be disposed between the second area (e.g., the second area 230*b* of FIG. 2A) of the first display 230 and a second printed circuit board 272. According to some embodiments, the at least one wiring member 263 and/or at least a portion of the hinge device 264 may be disposed to be supported through at least a portion of the support member assembly 260. According to some embodiments, the at least one wiring member 263 may be disposed to extend in a direction (e.g., x-axis direction) crossing the first support member 261 and the second support member 262. According to some embodiments, the at least one wiring member 263 may be disposed to extend in a direction (e.g., the x-axis direction) substantially perpendicular to the folding axis (e.g., the y-axis or the folding axis A1 of FIG. 2A) of the folding area 230*c*.

According to various embodiments, the at least one printed circuit board 270 may include a first printed circuit board 271 disposed to face the first support member 261 and/or a second printed circuit board 272 disposed to face the second support member 262. According to some embodiments, the first printed circuit board 271 and the second printed circuit board 272 may be disposed in an inner space formed by the support member assembly 260, the first housing 210, the second housing 220, and the first rear cover 240, and/or the second rear cover 250. According to some embodiments, the first printed circuit board 271 and the second printed circuit board 272 may include a plurality of electronic components to implement various functions of the electronic device 200.

According to various embodiments, the electronic device 200 may include a first printed circuit board 271 disposed in a first space of the first housing 210, a first battery 291 disposed at a position facing a first swelling hole 2611 of the first support member 261, at least one camera module 282 (e.g., the first camera module 216*a* and/or the second camera module 216*b* of FIG. 2A), or at least one sensor module 281 (e.g., the first sensor module 217*a* and/or the second sensor module 217*b* of FIG. 2A). According to some embodiments, the electronic device 200 may include a second printed circuit board 272 disposed in the second space of the second housing 220 or a second battery 292 disposed in a position facing a second swelling hole 2621 of the second support member 262. According to some embodiments, the first housing 210 may be integrally formed with the first support member 261. According to some embodiments, the second housing 220 may be integrally formed with the second support member 262.

According to various embodiments, the first housing 210 may include a first rotation support surface 214, and the second housing 220 may include a second rotation support surface 224 corresponding to the first rotation support surface 214. According to some embodiments, the first rotation support surface 214 and the second rotation support surface 224 may include curved surfaces corresponding to (naturally connected to) a curved outer surface of the hinge cover 265. According to some embodiments, when the electronic device 200 is in an unfolded state, the first rotation support surface 214 and the second rotation support surface 224 may cover the hinge cover 265, thereby not exposing the hinge cover 265 from the rear surface of the electronic device 200 or exposing only a portion thereof. According to some embodiments, when the electronic device 200 is in a folded state, the first rotation support surface 214 and the second rotation support surface 224 may rotate along the curved outer surface of the hinge cover 265 to expose at least a portion of the hinge cover 265 to the rear surface of the electronic device 200.

Figure 4A:
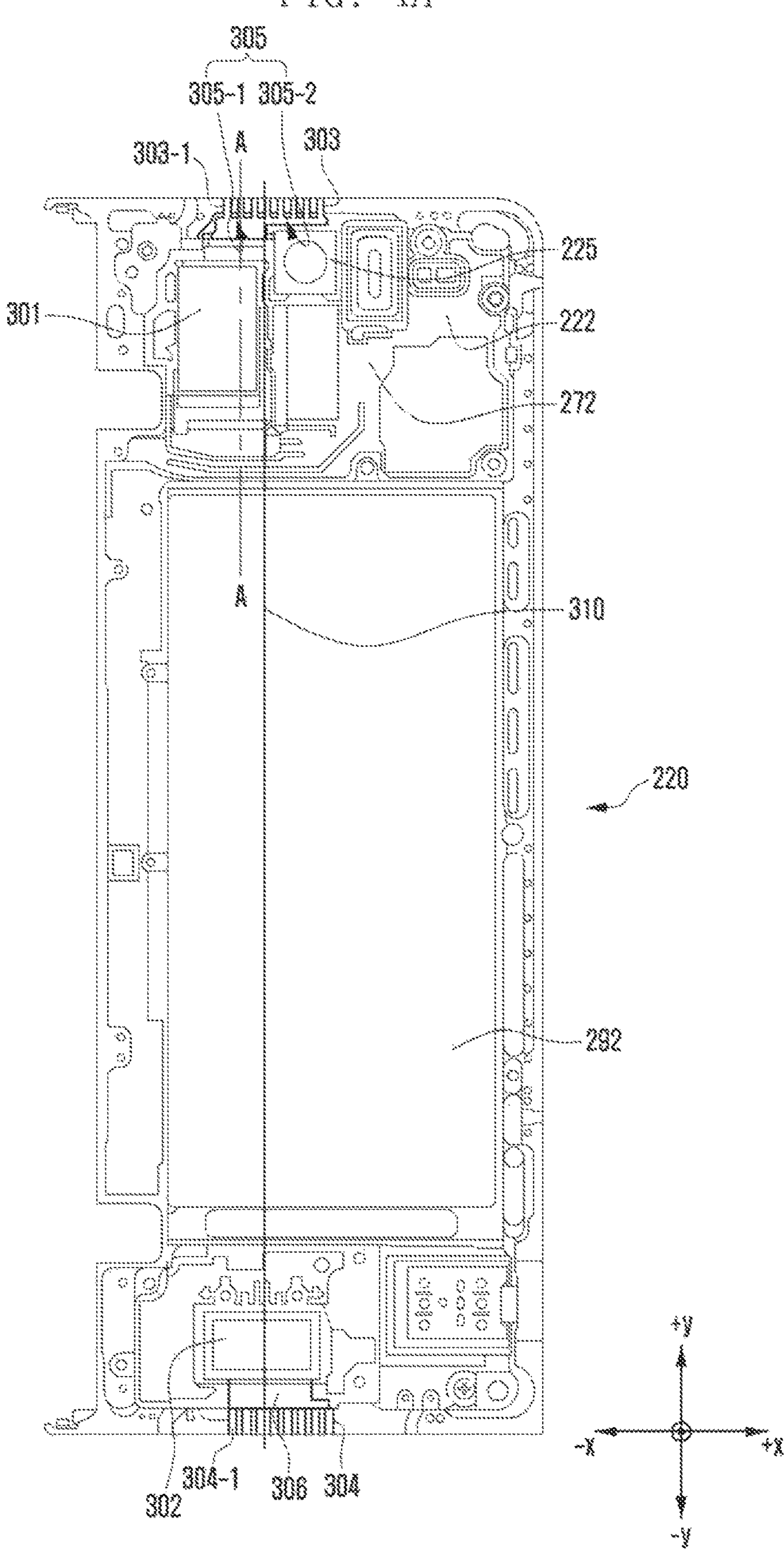
FIG. 4A illustrates the front surface of a housing and a peripheral component thereof according to various embodiments.
Figure 4B:
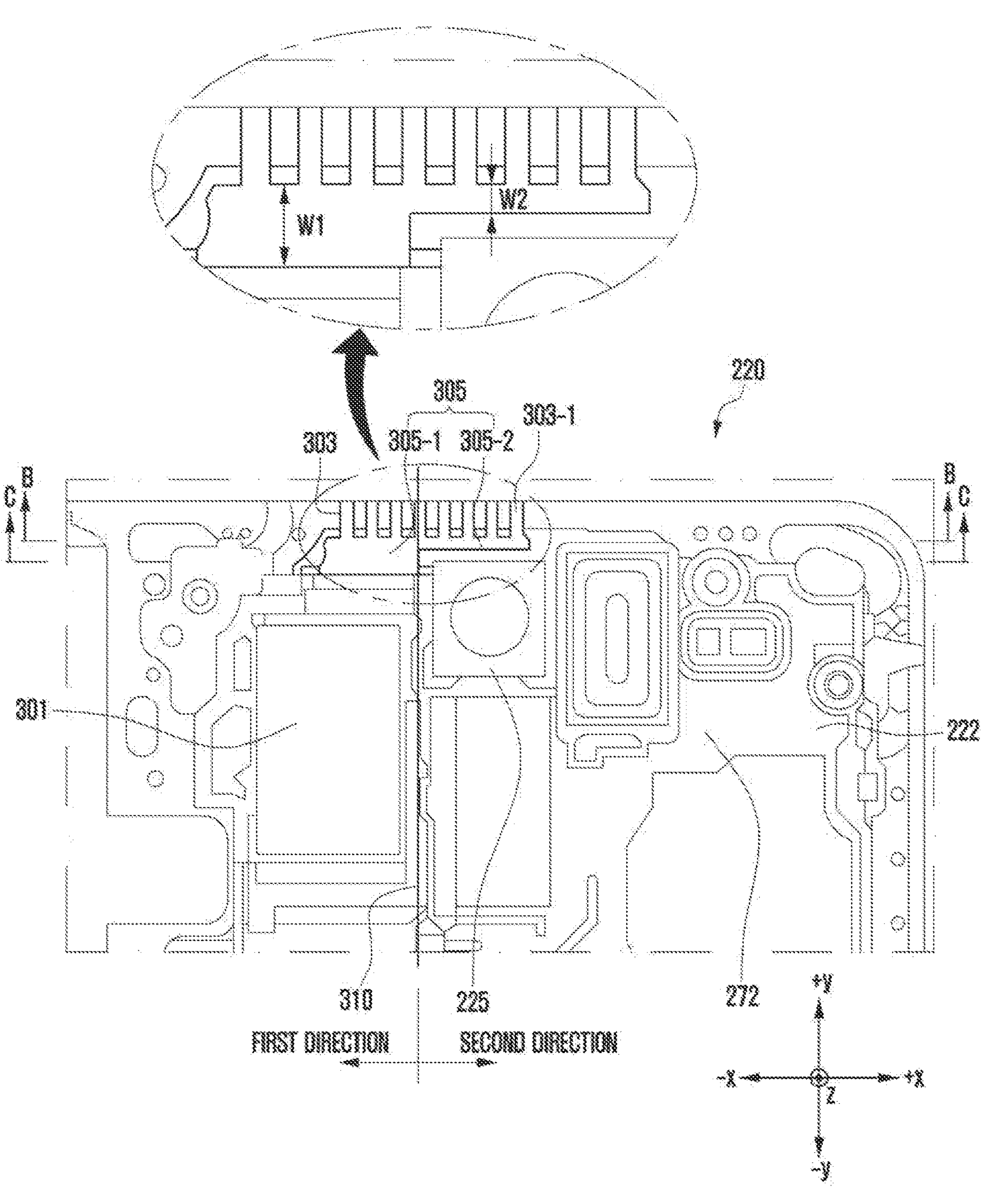
FIG. 4B is a top plan view illustrating the upper end of the front surface of a housing according to various embodiments.
Figure 4C:
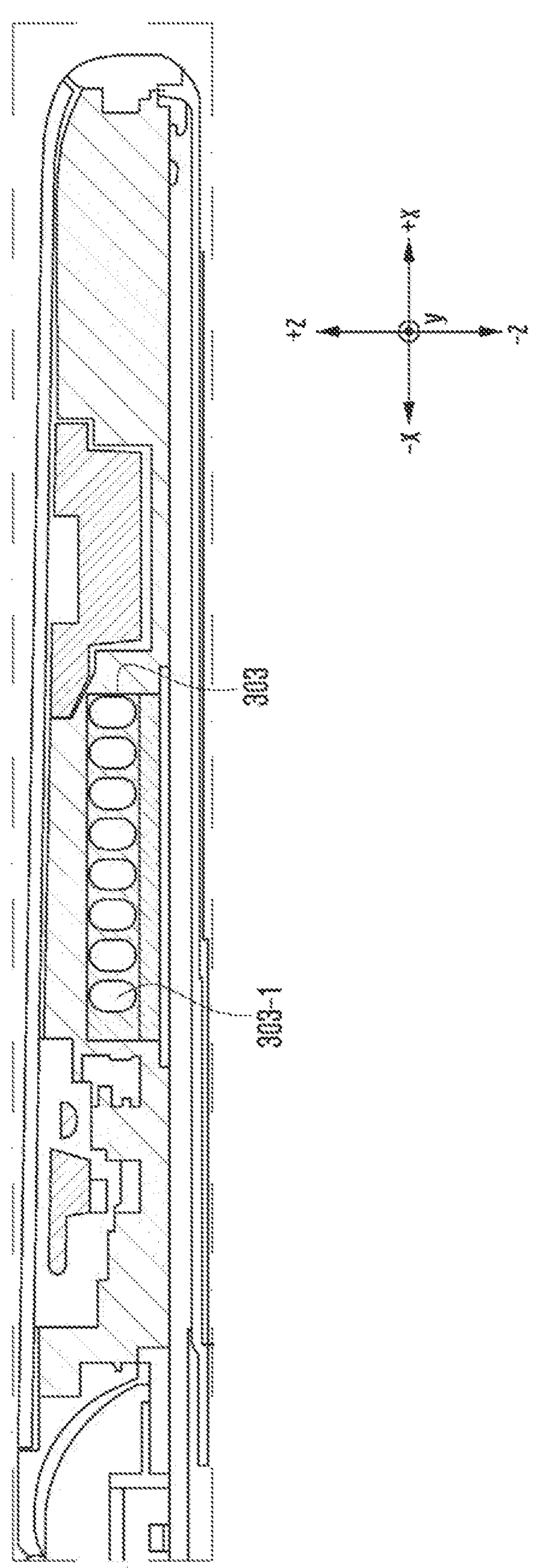
FIG. 4C is a cross-sectional view taken along line B-B of FIG. 4B.
Figure 4D:
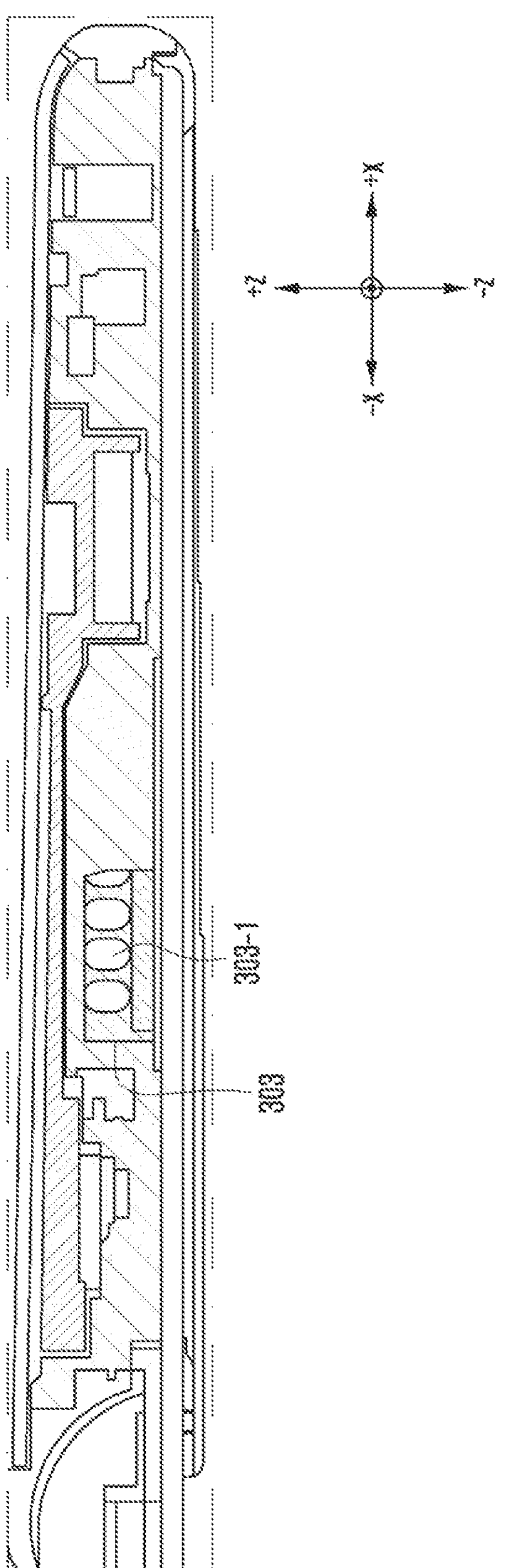
FIG. 4D is a cross-sectional view taken along line C-C of FIG. 4B.

FIG. 4A illustrates the front surface of a housing and a peripheral component thereof according to various embodiments disclosed herein. FIG. 4B is a top plan view illustrating the upper end of the front surface of a housing according to various embodiments disclosed herein. FIG. 4C is a cross-sectional view taken along line B-B of FIG. 4B. FIG. 4D is a cross-sectional view taken along line C-C of FIG. 4B. In the following, detailed descriptions of the same or similar components described above are omitted and the same reference numbers are used for components to be described.

According to various embodiments, as shown in FIG. 4A, an upper speaker module 301 (e.g., the sound output module 155 of FIG. 1, the sound output device 228 of FIG. 2A) on the front surface 222 (e.g., the fourth side 222 of FIG. 2A), a lower speaker module 302 (e.g., the sound output module 155 of FIG. 1, the sound output device 228 of FIG. 2A), an upper conduit 305, a lower conduit 306, a camera module

225 (e.g., the camera module 180 of FIG. 1, the third camera module 225 of FIG. 2A), a printed circuit board 272 (e.g., the second printed circuit board 272 of FIG. 3), a battery 292 (e.g., battery 189 of FIG. 1 or second battery 292 of FIG. 3), and a display module 160 (e.g., the display module 160 of FIG. 1, the first display 230 of FIG. 2A or the second display 400 of FIG. 2A) may disposed and formed on the housing 220 (e.g., the second housing 220 of FIG. 2A) that is the body of the electronic device 200 (e.g., the electronic device 101 of FIG. 1 or the electronic device 200 of FIG. 2A). The housing 220 to be described below may include a support member 262 (e.g., the second support member 262 of FIG. 3).

According to various embodiments, various electronic components included in the electronic device 200 may be disposed in the housing 220 of the electronic device 200 and at least a portion thereof may correspond to the appearance of the electronic device 200. According to an embodiment, the printed circuit board 272, the camera module 225, and the speaker modules 301 and 302 may be disposed in the housing 220. In addition, various electronic components may be disposed in the housing 220.

According to various embodiments, at least one of the electronic components included in the electronic device 200 may be electrically connected to the printed circuit board 272. For example, the speaker modules 301 and 302 and the camera module 225 may be electrically connected to the printed circuit board 272.

According to various embodiments, the upper speaker module 301 and the lower speaker module 302 may be devices disposed in the electronic device 200 and may move to move air, and thereby output sound. The upper speaker module 301 and the lower speaker module 302 may output sound according to the execution of an application or function. For example, the upper speaker module 301 and the lower speaker module 302 may receive an audio signal processed through an audio module (e.g., the audio module 170 of FIG. 1) and output the signal as sound.

According to various embodiments, referring to FIG. 2B, the upper speaker module 301 may be used as a receiver 227 for communication. In a call operation, ring sound of an incoming call may be delivered to the user through the upper speaker module 301. In the case of a foldable electronic device 200, the user may fold the electronic device 200 so as to easily hold the electronic device 200 during a call operation. Because the user's ear may come close to the upper center portion of the electronic device 200 in an operation in which the user holds the folded electronic device 200 to make a call, a portion through which the call sound is emitted may be located at the upper center portion of the electronic device 200. For example, a receiver hole through which the call sound generated from the upper speaker module 301 is emitted may be disposed at the center of the upper end of the second rear cover 250. Therefore, the upper speaker module 301 connected to the receiver hole may be disposed at the central upper end of the front surface 222 of the housing 220. According to another embodiment, the receiver 227 and the upper speaker module 301 may be separate parts.

According to various embodiments, as shown in FIG. 4A, sound holes 303 and 304 may be disposed at (i.e., formed through) the upper end and/or the lower end of the housing 220 of the electronic device 200. The sound holes 303 and 304 may include an upper sound hole 303 disposed in the upper lateral surface (e.g., the +Y direction of FIG. 4A) of the housing 220 and a lower sound hole 304 disposed in the lower lateral surface (e.g., the −Y direction of FIG. 4A) of the housing 220. The upper sound hole 303 and the lower sound hole 304 may be disposed in the center portion of the upper lateral surface of the housing 220 and through the center portion of the lower lateral surface of the housing 220, respectively, to be symmetrical to each other along the X-axis of FIG. 4A. Sounds generated from the speaker modules 301 and 302 may be radiated to the outside of the electronic device 200 through the sound holes 303 and 304.

According to various embodiments, an upper conduit 305 may be connected to the upper speaker module 301 and the upper sound hole 303, and may be a portion of the upper speaker module 301. The upper conduit 305 may guide sound output from the upper speaker module 301 to the upper sound hole 303.

According to various embodiments, a lower conduit 306 may be connected to the lower speaker module 302 and the lower sound hole 304 and may be a portion of the lower speaker module 302. The lower conduit 306 may guide sound output from the lower speaker module 302 to the lower sound hole 304. As shown in FIG. 4A, the lower conduit 306 may extend from the lower speaker module 302 toward the lower sound hole 304 (e.g., the −Y direction of FIG. 4A).

According to various embodiments, the user may take a self-photograph through the camera module 225. In the case of the foldable electronic device 200, the electronic device 200 may be folded to facilitate self-photographing through a specific camera. For example, referring to FIG. 2B, when taking a self-photograph by using the camera module 225, the user may fold the electronic device 200. The lens of the camera module 225 may be placed at the center of the upper end of the display module 160 to allow the user to easily adjust the photographing composition by viewing the user's image previewed on the display module 160 through the camera module 225. In an embodiment, a transparent region through which light may be incident to the lens of the camera module 225 may be provided in the display module 160, and the lens may face the transparent region. Disposing the lens at the center of the upper end of the display module 160 may indicate that the transparent region of the display module 160 is located at the center of the upper end of the display module 160. In addition, the lens may be positioned at the center of the upper end of the display module 160 in various manners. A symmetrical design may be implemented by disposing the lens of the camera module 225 at the center of the display module 160.

According to various embodiments, as shown in FIGS. 4A and 4B, the upper speaker module 301 and the camera module 225 are disposed at the central upper end of the front surface 222 of the housing 220, and the upper speaker module 301 and the camera module 225 may overlap each other in the Z-axis direction. In this regard, as discussed below, the shape of the upper conduit 305 connected to the upper speaker module 301 may be variable.

According to various embodiments, as shown in FIG. 4B, the camera module 225 and the upper speaker module 301 may be disposed at the center of the upper end of the housing 220 to be adjacent to each other.

When the camera module 225 and the upper speaker module 301 are disposed adjacent to each other, the upper speaker module 301 may be disposed in a first direction (e.g., the first direction of FIG. 4B) with respect to a line 310 extending in the longitudinal direction of the housing 220. The camera module 225 may be disposed in a second direction (e.g., the second direction of FIG. 4B) with respect to the line 310 extending in the longitudinal direction of the housing 220.

According to various embodiments, as shown in FIG. 4B, a first conduit 305-1 and a second conduit 305-2 of the upper conduit 305 may be connected. The first conduit 305-1 of the upper conduit 305 may be disposed in the first direction (e.g., the first direction of FIG. 4B) with respect to the line 310 extending in the longitudinal direction of the housing 220. The second conduit 305-2 of the upper conduits 305 may be disposed in the second direction (e.g., the second direction of FIG. 4B) with respect to the line 310 extending in the longitudinal direction of the housing 220. The first conduit 305-1 may extend from the upper speaker module 301 toward the upper sound hole 303 (e.g., the +Y direction of FIG. 4B). At least a portion of the second conduit 305-2 may extend in a direction perpendicular to the extension direction of the first conduit 305-1 (e.g., the X-axis direction or the second direction of FIG. 4B).

According to various embodiments, as shown in FIG. 4B, the width (W1) of the first conduit 305-1 and the width (W2) of the second conduit 305-2 may be different from each other. For example, the width (W2) of the second conduit 305-2 may be smaller than the width (W1) of the first conduit 305-1. Here, the width (W1) of the first conduit 305-1 may refer to the length of the first conduit 305-1 in the Y-axis direction, shown in FIG. 4B. In addition, the width (W2) of the second conduit 305-2 may refer to the length of the second conduit 305-2 in the Y-axis direction, shown in FIG. 4B. At least a portion of the camera module 225 may be disposed at a portion of the housing 220 corresponding to the difference between the width (W1) of the first conduit 305-1 and the width (W2) of the second conduit 305-2. Due to the shape of the upper conduit 305, the upper conduit 305 of the upper speaker module 301 and the camera module 225 may be disposed at the central upper end of the front surface 222 of the housing 220 without overlapping each other. For example, as shown in FIGS. 4C and 4D, a portion of the camera module 225 may be disposed at a portion corresponding to the difference between the width (W1) of the first conduit 305-1 and the width (W2) of the second conduit 305-2. Accordingly, a portion of the upper sound hole 303 may be covered by the portion of the camera module 225 when cut along line C-C in FIG. 4B.

According to various embodiments, as shown in FIGS. 4A and 4C, the upper sound hole 303 may include at least one hole 303-1 and the lower sound hole 304 may include at least one hole 304-1.

Sounds generated from the speaker modules 301 and 302 may be radiated to the outside of the electronic device 200 through the holes 303-1 and 304-1. The holes 303-1 and 304-1 may be arranged in a direction parallel to the direction in which the second conduit 305-2 extends (e.g., the X-axis direction of FIG. 4B).

The shape, structure, and location of the housing 220, the upper speaker module 301, the upper conduit 305, the lower speaker module 302, the lower conduit 306, the camera module 225, the upper sound hole 303, the lower sound hole 304 are only examples. The shape, structure, and location of the housing 220, the upper speaker module 301, the upper conduit 305, the lower speaker module 302, the lower conduit 306, the camera module 225, the upper sound hole 303, the lower sound hole 304 are not limited to those shown in FIG. 4A.

The width (W1) of the first conduit 305-1 and the width (W2) of the second conduit 305-2 shown in FIG. 4B are only examples and may be variously changed. In addition, the shapes and numbers of the holes 303-1 and 304-1 shown in FIGS. 4A to 4D are only examples and may be variously changed.

Figure 5A:
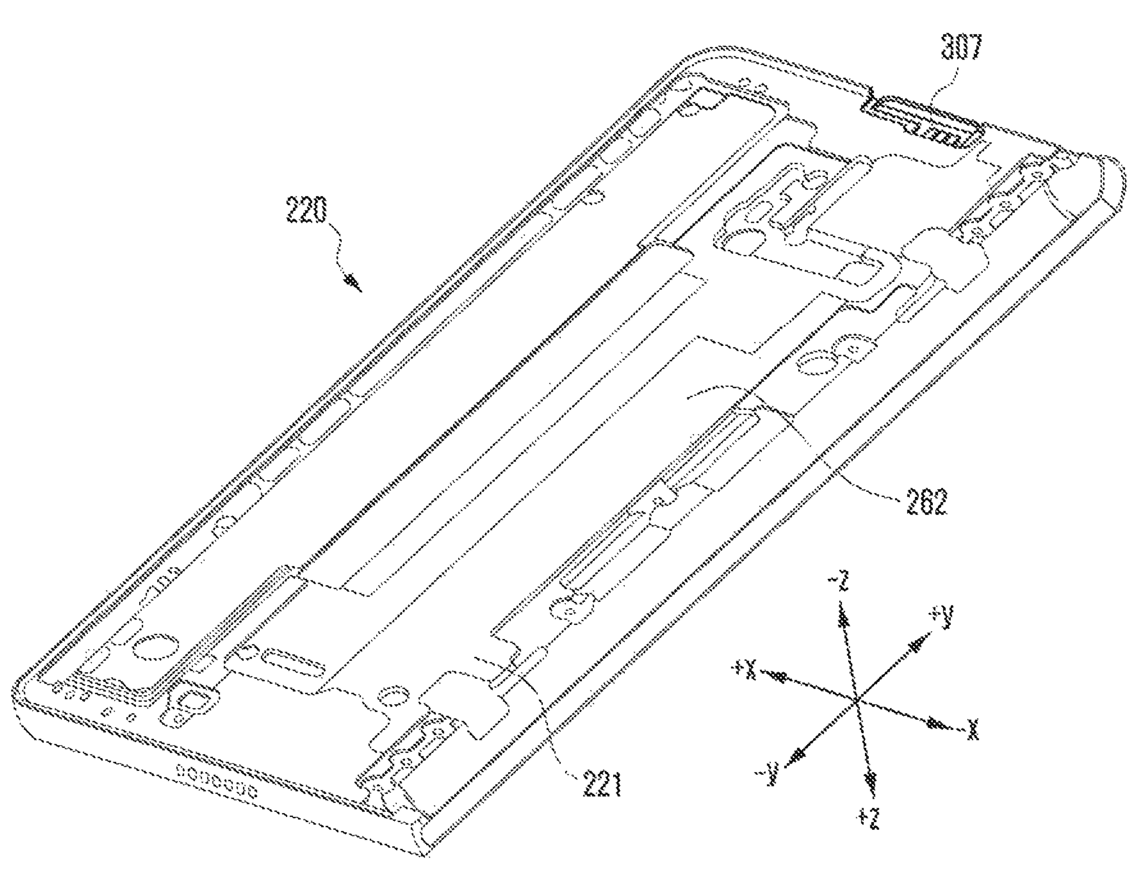
FIG. 5A is a rear perspective view of a housing according to various embodiments.
Figure 5B:
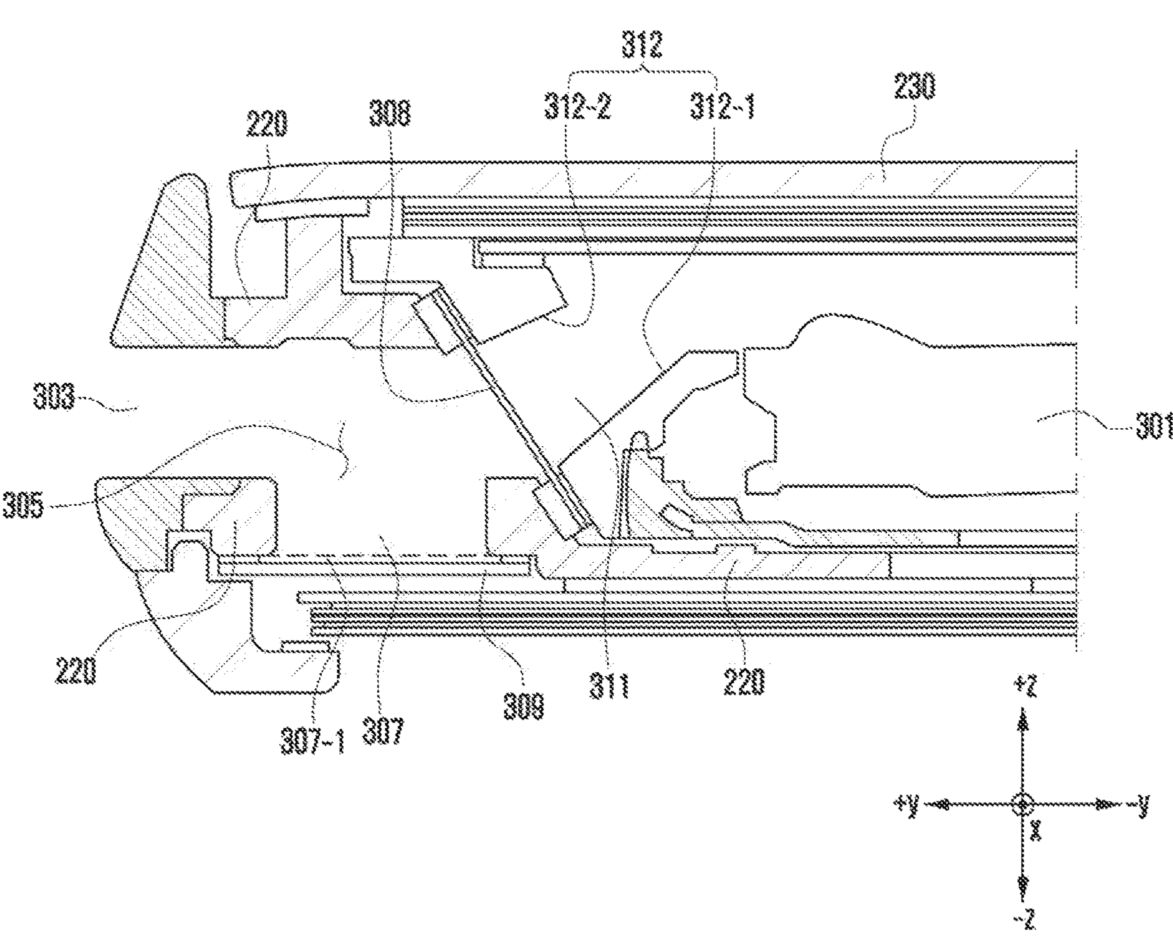
FIG. 5B is a cross-sectional view taken along line A-A of FIG. 4A.
Figure 5C:
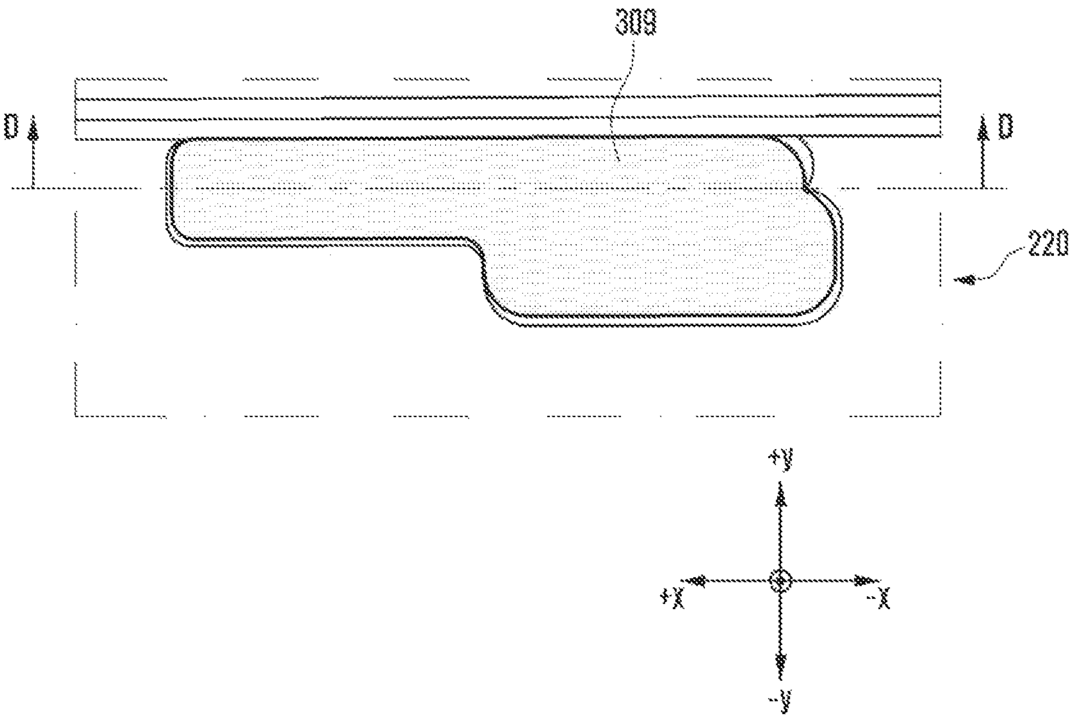
FIG. 5C is a plan view of a soundproofing material attached to an expansion portion according to various embodiments.
Figure 5D:
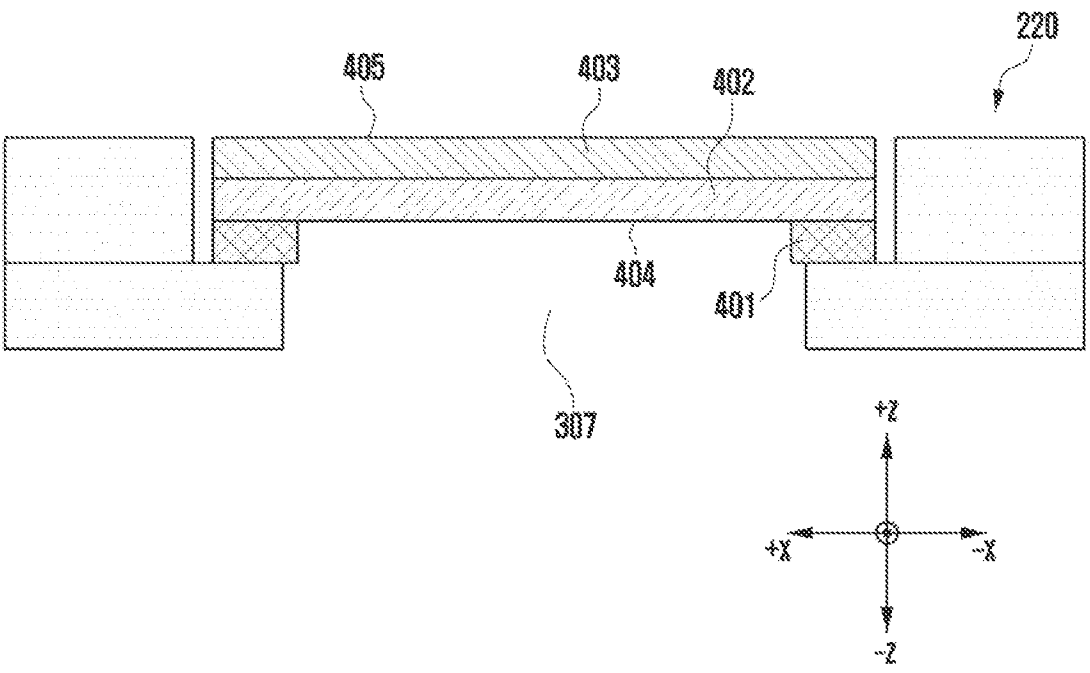
FIG. 5D is a cross-sectional view taken along line D-D of FIG. 5C.

FIG. 5A is a rear perspective view of a housing according to various embodiments disclosed herein. FIG. 5B is a cross-sectional view taken along line A-A of the housing of FIG. 4A. FIG. 5C is a plan view of a soundproofing material attached to an expansion portion according to various embodiments disclosed herein. FIG. 5D is a cross-sectional view taken along line D-D of FIG. 5C.

The front surface 222 (e.g., the fourth surface 222 of FIG. 2A) of the housing 220 (e.g., the second housing 220 of FIG. 2A), which is the body of the electronic device 200 (e.g., the electronic device 101 of FIG. 1 or the electronic device 200 of FIG. 2A), may be in the +Z direction in FIG. 5A, and the rear surface 221 (e.g., the third surface 221 in FIG. 2A) may be in the −Z direction in FIG. 5A. In addition, hereinafter, the display module 160 may include the display module 160 of FIG. 1, the first display 230 of FIG. 2A, or the second display 400 of FIG. 2A.

According to various embodiments, the expansion portion 307 may be disposed at the upper end of the housing 220. An opening 307-1, which accommodates the expansion portion 307, may be disposed at the upper end of the rear surface 221 of the housing 220. The expansion portion 307 may refer to a space in the housing 220 formed from the rear surface 221 to the front surface 222 of the housing 220 (e.g., the +Z direction of FIGS. 5A and 5B) through the opening 307-1. According to an embodiment, the upper conduit 305 may extend into the opening 307-1. For example, the upper conduit 305 may include or be communicably coupled to the expansion portion 307. The expansion portion 307 may refer to a space connecting the opening 307-1 to the upper conduit 305.

According to various embodiments, as shown in FIGS. 5A and 5B, the expansion portion 307 may be disposed in the upper conduit 305. As the volume of the upper conduit 305 decreases, the sound quality emitted from the upper sound hole 303 may deteriorate.

According to various embodiments, the upper conduit 305 may be formed through the expansion portion 307. In addition, the volume of the upper conduit 305 may increase due to the space formed by the expansion portion 307 according to the connection of the expansion portion 307 to the upper conduit 305, so that the sound quality of the upper conduit 305 may be improved.

According to various embodiments, as shown in FIG. 5B, guide surfaces 312-1 and 312-2 (collectively guide surfaces 312) may be inclined to have a cross-sectional area expanded along the traveling direction of sound (e.g., the +Y direction in FIG. 5B) from an outlet 311 via which the sound generated from the upper speaker module 301 comes out. As a result of the cross-sectional area expanded along the traveling direction of the sound, the first conduit 305-1 may secure an additional space.

According to various embodiments, as shown in FIG. 5B, a waterproof member 308 may be attached to a portion of the end of each of the guide surfaces 312-1 and 312-2. The waterproof member 309 may protect the upper speaker module 301 from liquid introduced through the upper sound hole 303.

According to various embodiments, as shown in FIG. 5B, a soundproofing material 309 may be disposed in the opening 307-1. The soundproofing material 309 may close the opening 307-1. The expansion portion 307 may be partitioned by the soundproofing material 309. For example, the soundproofing material 309 may be attached to the opening 307-1 to close the opening 307-1. The soundproofing material 309 may prevent sound generated in the speaker module 301 from being emitted through the opening 307-1. In addition, the soundproofing material 309 may be secured in the opening 307-1 in various manners. For example, the soundproofing material 309 may be secured in the opening 307-1 by soldering or bolting.

According to various embodiments, as shown in FIG. 5C, the soundproofing material 309 having a shape similar to the upper conduit 305 of FIG. 4A may be manufactured to have a larger area than the upper conduit 305.

According to various embodiments, as shown in FIG. 5D, the soundproofing material 309 may include two or more types of materials. For example, as shown in FIG. 5D, the soundproofing material 309 may include a structure in which an adhesive member 401, an intermediate member 402, and a buffer member 403 are sequentially stacked. One surface 404 of the intermediate member 402 of the soundproofing material 309 may close the opening 307-1 through the adhesive member 401.

According to various embodiments, the adhesive member 401 may also be attached to the other surface 405 of the buffer member 403. The other surface 405 of the buffer member 403 may be attached to the display module 160 through the adhesive member 401. The buffer member 403 may absorb shock applied to the display module 160.

According to various embodiments, the other surface 405 of the buffer member 403 may be a rough surface. The adhesive member 401 may be attached to the other surface 405 of the buffer member 403. When the adhesive member 401 is a thin film, surface roughness of a surface thereof attached to the display module 160 may also increase. Therefore, the position of the display module 160 may be fixed and maintained on the other surface 405 of the buffer member 403.

The expansion portion 307, the opening 307-1, and the soundproofing material 309 shown in FIGS. 5A, 5B, and 5C are only examples, and the shape and structure of the expansion portion 307, the opening 307-1, and the soundproofing material 309 are not limited to those shown in FIGS. 5A, 5B and 5C. The degree of inclination of the guide surfaces 312-1 and 321-2 shown in FIG. 5B is an example and the degree of inclination may be variable. The number and types of members constituting the soundproofing material 309 shown in FIG. 5D are examples, and the adhesive member 401, the intermediate member 402, and the buffer member 403 may be variously changed.

Figure 6:
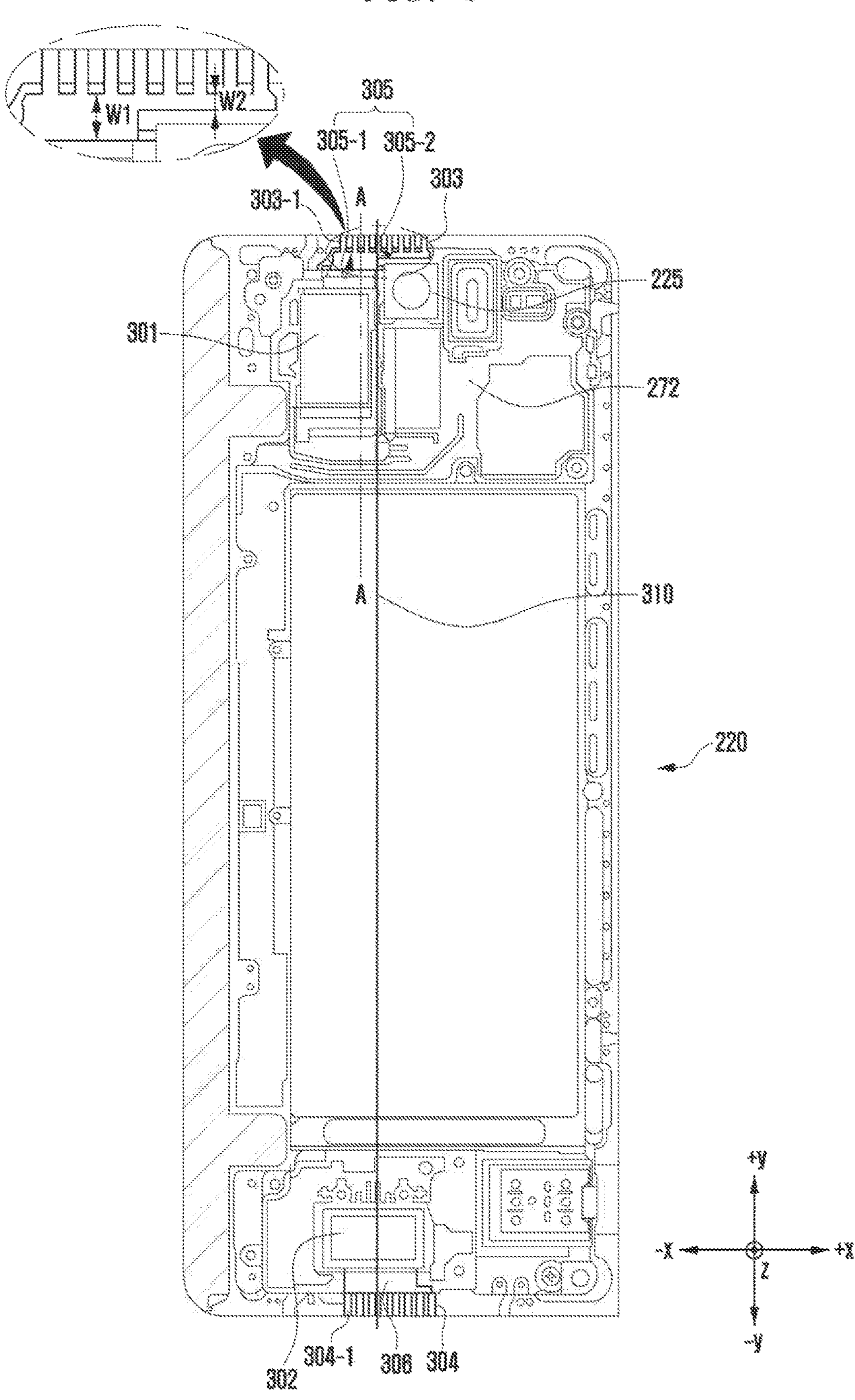
FIG. 6 is a plan view of a bar-shaped electronic device according to various embodiments.

FIG. 6 is a plan view of a bar-shaped electronic device according to various embodiments disclosed herein. According to various embodiments, the layout structure of the electronic device and the configuration of electronic components, shown in FIGS. 4A to 5D, may also be applied to a bar-shaped electronic device.

According to various embodiments disclosed herein, as shown in FIG. 6, the electronic device 200 (e.g., the electronic device 101 of FIG. 1 and the electronic device 200 of FIG. 2A) may include an upper speaker module 301 (e.g., the sound output module 155 of FIG. 1, the sound output device 228 of FIG. 2A), a lower speaker module 302 (e.g., the sound output module 155 of FIG. 1, a sound output device 228 of FIG. 2A), an upper conduit 305, a lower conduit 306, a camera module 225 (e.g., the camera module 180 of FIG. 1, the third camera module 225 of FIG. 2A), a printed circuit board 272 (e.g., the first printed circuit board 271 or the second printed circuit board 272 of FIG. 3), a battery 292 (e.g., the battery 189 of FIG. 1, the first battery 291 or the second battery 292 of FIG. 3), and a display module 160 (e.g., the display module 160 of FIG. 1, the first display 230 of FIG. 2A, or the second display 400 of FIG. 2A), which are disposed on the front surface 222 (e.g., the fourth surface 222 of FIG. 2A) of the housing 220 (e.g., the second housing 220 of FIG. 2A). The housing 220 described below may include a support member 262 (e.g., the second support member 262 of FIG. 3).

According to various embodiments, referring to FIG. 2B, the upper speaker module 301 may be used as a receiver 227 for communication. In a call operation, ring sound of an incoming call may be delivered to the user through the upper speaker module 301.

Because the user's ear may come close to the upper center portion of the electronic device 200 in an operation in which the user holds the electronic device 200 to make a call, a portion through which the call sound is emitted may be located at the upper center portion of the electronic device 200. For example, a receiver hole through which the call sound generated from the upper speaker module 301 is emitted may be disposed at the center of the upper end of the second rear cover 250. Therefore, the upper speaker module 301 connected to the receiver hole may be disposed at the center of the upper end of the front surface 222 of the housing 220. According to another embodiment, the receiver 227 and the upper speaker module 301 may be separate parts.

According to various embodiments, as shown in FIG. 6, sound holes 303 and 304 may be disposed at the upper end and/or the lower end of the housing 220 of the electronic device 200. The sound holes 303 and 304 may include an upper sound hole 303 disposed in the upper lateral surface (e.g., the +Y direction of FIG. 6) of the housing 220 and a lower sound hole 304 disposed in the lower lateral surface (e.g., the −Y direction of FIG. 6) of the housing 220. The upper sound hole 303 and the lower sound hole 304 may be disposed in the center portion of the upper lateral surface of the housing 220 and through the center portion of the lower lateral surface of the housing 220, respectively, to be symmetrical to each other along the X-axis of FIG. 6. Sounds generated from the speaker modules 301 and 302 may be radiated to the outside of the electronic device 200 through the sound holes 303 and 304.

According to various embodiments, the user may take a self-photograph through the camera module 225. The lens of the camera module 225 may be placed at the center of the upper end of the display module 160 to allow the user to easily adjust the photographing composition by viewing the user's image previewed on the display module 160 through the camera module 225. In an embodiment, a transparent region through which light may be incident to the lens of the camera module 225 may be provided in the display module 160, and the lens may face the transparent region. Disposing the lens at the center of the upper end of the display module 160 may indicate that the transparent region of the display module 160 is located at the center of the upper end of the display module 160. In addition, the lens may be positioned at the center of the upper end of the display module 160 in various manners. A symmetrical design may be implemented by disposing the lens of the camera module 225 at the center of the display module 160.

According to various embodiments, as shown in FIG. 6, the upper speaker module 301 and the camera module 225 are disposed at the central upper end of the front surface 222 of the housing 220, and the upper speaker module 301 and the camera module 225 may overlap each other in the Z-axis direction. In this regard, as discussed below, the shape of the upper conduit 305 connected to the upper speaker module 301 may be variable.

According to various embodiments, as shown in FIG. 6, the width (W2) of the second conduit 305-2 may be smaller than the width (W1) of the first conduit 305-1. Here, the width (W1) of the first conduit 305-1 may refer to the length of the first conduit 305-1 in the Y-axis direction, shown in FIG. 6. In addition, the width (W2) of the second conduit 305-2 may refer to the length of the second conduit 305-2 in the Y-axis direction, shown in FIG. 6. At least a portion of the camera module 225 may be disposed at a portion of the housing 220 corresponding to the difference between the width (W1) of the first conduit 305-1 and the width (W2) of the second conduit 305-2. Due to the shape of the upper conduit 305, the upper conduit 305 and the camera module 225 may be disposed at the upper central portion of the housing 220 without overlapping each other.

According to various embodiments, the expansion portion 307 may be disposed at the upper end of the housing 220. As shown in FIG. 5B, an opening 307-1, which is a portion of the expansion portion 307, may be disposed at the upper end of the rear surface 221 of the housing 220. The expansion portion 307 may refer to a space in the housing 220 formed from the rear surface 221 to the front surface 222 of the housing 220 (e.g., the +Z direction of FIGS. 5A and 5B) through the opening 307-1. In another embodiment, the opening 307-1 may be disposed at the upper end of the front surface 222 of the housing 220. The upper conduit 305 may be formed through the opening 307-1 that is a portion of the expansion portion 307. The expansion portion 307 may refer to a space connecting the opening 307-1 to the upper conduit 305.

According to various embodiments, as shown in FIGS. 5A and 5B, the expansion portion 307 may be disposed in the upper conduit 305. As the volume of the upper conduit 305 decreases, the sound quality emitted from the upper sound hole 303 may deteriorate.

According to various embodiments, the upper conduit 305 may be formed through the expansion portion 307. In addition, the volume of the upper conduit 305 may increase due to the space formed by the expansion portion 307 according to the connection of the expansion portion 307 to the upper conduit 305, so that the sound quality of the upper conduit 305 may be improved.

According to various embodiments, as shown in FIG. 5B, guide surfaces 312-1 and 312-2 may be inclined to have a cross-sectional area expanded along the traveling direction of sound (e.g., the +Y direction in FIG. 5B) from an outlet 311 via which the sound generated from the upper speaker module 301 come out. As a result of the cross-sectional area expanded along the traveling direction of the sound, the first conduit 305-1 may secure an additional space.

According to various embodiments, as shown in FIG. 5B, a waterproof member 308 may be attached to a portion of the end of each of the guide surfaces 312-1 and 312-2. The waterproof member 309 may protect the upper speaker module 301 from liquid introduced through the upper sound hole 303.

According to various embodiments, the opening 307-1 of FIG. 5B may be disposed on the rear surface 221 of the housing 220 of FIG. 5A and may be connected to the expansion portion 307. In another embodiment, the opening 307-1 may be disposed on the front surface 222 of the housing 220 and may be connected to the expansion portion 307. The opening 307-1 may be closed through the soundproofing material 309 of FIG. 5A. Therefore, the soundproofing material 309 may prevent sound generated in the speaker module 301 from being emitted through the opening 307-1.

According to various embodiments, as shown in FIG. 5D, the soundproofing material 309 may include two or more types of materials. For example, as shown in FIG. 5D, the soundproofing material 309 may include a structure in which an adhesive member 401, an intermediate member 402, and a buffer member 403 are sequentially stacked. One surface 404 of the intermediate member 402 of the soundproofing material 309 may close the opening 307-1 through the adhesive member 401.

According to various embodiments, the adhesive member 401 shown in FIG. 5D may also be attached to the other surface 405 of the buffer member 403. The other surface 405 of the buffer member 403 may be attached to the display module 160 through the adhesive member 401. The buffer member 403 may absorb shock applied to the display module 160.

According to various embodiments, the other surface 405 of the buffer member 403 may be a rough surface. The adhesive member 401 may be attached to the other surface 405 of the buffer member 403. When the adhesive member 401 is a thin film, surface roughness of a surface thereof attached to the display module 160 may also increase. Therefore, the position of the display module 160 may be fixed and maintained on the other surface 405 of the buffer member 403.

While aspects of embodiments have been particularly shown and described, it will be understood that various changes in form and details may be made therein without departing from the spirit and scope of the following claims.

What is claimed is:

1. An electronic device comprising:
a first housing;
a display disposed on a front surface of the first housing;
a camera provided on the first housing;
an upper speaker module provided on the first housing adjacent the camera;
an upper sound hole that extends through an upper lateral surface of the first housing and is configured to emit sound generated by the upper speaker module to outside the electronic device;
an upper conduit comprising a first conduit extending from the upper speaker module toward the upper sound hole in an extension direction, and a second conduit extending in a direction perpendicular to the extension direction of the first conduit;
an opening formed at an upper end of a rear surface of the first housing, offset from the upper speaker module along the extension direction, and overlapping with at least one of the first conduit or the second conduit when viewed in a direction perpendicular to the rear surface of the first housing, the opening being connected to the first conduit and the second conduit; and
an expansion portion connecting the upper conduit and the opening in the direction perpendicular to the rear surface of the first housing.

2. The electronic device of claim 1, wherein a straight line extends in the extension direction between the first conduit and the second conduit, and through the upper sound hole,
wherein the upper speaker module is provided on a first side of the straight line, and
wherein the camera is provided on a second side of the straight line.

3. The electronic device of claim 2, wherein the first conduit is provided on the first side of the straight line, and
wherein the second conduit is provided on the second side of the straight line.

4. The electronic device of claim 3, wherein the second conduit is narrower than the first conduit along the extension direction.

5. The electronic device of claim 1, wherein the upper sound hole comprises at least one hole, and wherein the at least one hole of the upper sound hole extends in the extension direction.

6. The electronic device of claim 1, wherein the upper speaker module is configured to radiate sound through the upper sound hole in the extension direction, and wherein the first conduit comprises a structure inclined with respect to the extension direction.

7. The electronic device of claim 1, further comprising a second housing that is foldably connected to the first housing.

8. The electronic device of claim 7, wherein the display comprises a first region provided in the first housing, a second region provided in the second housing, and a third region connecting the first region and the second region, and wherein the third region of the display is at least partially foldable.

9. The electronic device of claim 1, wherein the electronic device further comprises a soundproofing material provided in the opening.

10. The electronic device of claim 9, wherein the soundproofing material comprises a buffer.

11. The electronic device of claim 1, wherein the upper speaker module is provided on an upper portion of the first housing, and wherein the electronic device further comprises:

a lower speaker module provided at a lower portion of the first housing;

a lower sound hole extending through a lower lateral surface of the first housing; and a lower conduit extending from the lower speaker module to the lower sound hole.

12. The electronic device of claim 11, wherein the lower sound hole comprises at least one hole, and wherein the at least one hole of the lower sound hole extends in the extension direction.

13. An electronic device comprising:

a first housing;

a display disposed on a front surface of the first housing and extending in a first longitudinal direction and a second longitudinal direction which crosses the first longitudinal direction;

a rear cover;

a side structure that extends from the display to the rear cover;

a first speaker that is provided in a space between the rear cover and the display, and is configured to emit sound through first holes and second holes that are formed through the side structure, wherein the first holes overlap the first speaker along the first longitudinal direction and the second holes are offset from the first speaker along the second longitudinal direction;

a conduit comprising a first portion extending in the first longitudinal direction from the first speaker to the first holes and a second portion that is offset from the first speaker along the first longitudinal direction and is communicably connected to the first portion;

an opening formed at an upper end of a rear surface of the first housing, offset from the first speaker along the first longitudinal direction and overlapping with the conduit when viewed in a direction perpendicular to the rear surface of the first housing, the opening being connected to the conduit; and an expansion portion connecting the conduit and the opening in the direction perpendicular to the rear surface of the first housing.

14. The electronic device of claim 13, wherein the display is configured to emit light in a display direction, and wherein the first longitudinal direction and the second longitudinal direction are perpendicular to the display direction.

15. The electronic device of claim 14, wherein the first holes and the second holes are sequentially provided through the side structure and arranged in the second longitudinal direction.

16. The electronic device of claim 15, wherein each of the first holes and the second holes extends through the side structure in the first longitudinal direction.

17. The electronic device of claim 16, further comprising a camera provided in the space, wherein the camera overlaps the first speaker along the second longitudinal direction.

* * * * *